US012610293B2

(12) United States Patent
Orsino

(10) Patent No.: US 12,610,293 B2
(45) Date of Patent: Apr. 21, 2026

(54) COMMUNICATING FAILURE INFORMATION FOR A SECONDARY CELL GROUP (SCG)

(71) Applicant: Telefonaktiebolaget LM Ericsson (publ), Stockholm (SE)

(72) Inventor: Antonino Orsino, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 318 days.

(21) Appl. No.: 18/567,266

(22) PCT Filed: Jun. 14, 2022

(86) PCT No.: PCT/SE2022/050581
§ 371 (c)(1),
(2) Date: Dec. 5, 2023

(87) PCT Pub. No.: WO2022/271063
PCT Pub. Date: Dec. 29, 2022

(65) Prior Publication Data
US 2024/0292291 A1     Aug. 29, 2024

Related U.S. Application Data

(60) Provisional application No. 63/212,969, filed on Jun. 21, 2021.

(51) Int. Cl.
*H04W 36/00*          (2009.01)
*H04W 76/19*          (2018.01)
(52) U.S. Cl.
CPC ....... *H04W 36/0079* (2018.08); *H04W 76/19* (2018.02)

(58) Field of Classification Search
CPC .. H04W 36/0079; H04W 76/19; H04W 76/15
See application file for complete search history.

(56) References Cited

U.S. PATENT DOCUMENTS 12,004,027 B2 *   6/2024   Latheef ............. H04W 36/0085
12,477,428 B2 *   11/2025  Fujishiro .............. H04W 72/04
(Continued)

OTHER PUBLICATIONS

"3GPP TS 36.331 V15.13.0", 3rd Generation Partnership Project; Technical Specification Group Radio Access Network; Evolved Universal Terrestrial Radio Access (E-UTRA); Radio Resource Control (RRC); Protocol specification (Release 15), Mar. 2021, pp. 1-949.
(Continued)

*Primary Examiner* — Ping Y Hsieh
(74) *Attorney, Agent, or Firm* — Murphy, Bilak & Homiller, PLLC

(57) ABSTRACT

Embodiments include methods for a user equipment (UE) configured to communicate with a wireless network via a master cell group (MCG) and a secondary cell group (SCG). Such methods include detecting a failure in the SCG and selecting a failure cause. The failure cause is selected from the following: a first set of causes associated with an earlier version of communication functionality, and a second set of causes associated with a later version of communication functionality. Such methods include sending a failure information message to a network node that provides the MCG, wherein the failure information message indicates whether the failure cause is one of the first set or one of the second set. Other embodiments include complementary methods for a network node that provides the MCG, as well as UEs and network nodes configured to perform such methods.

20 Claims, 11 Drawing Sheets

(56) References Cited

U.S. PATENT DOCUMENTS

| | | | | |
|---|---|---|---|---|
| 2020/0229257 A1* | 7/2020 | Venugopal | | H04B 7/06964 |
| 2021/0058833 A1* | 2/2021 | Basu Mallick | | H04L 69/321 |
| 2022/0190902 A1* | 6/2022 | Zhang | | H04B 7/06956 |
| 2024/0049098 A1* | 2/2024 | Wang | | H04W 36/0083 |

OTHER PUBLICATIONS

"3GPP TS 36.300 V16.4.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Dec. 2020, pp. 1-391.

"3rd Generation Partnership Project; Technical Specification Group Services and System Aspects; System architecture for the 5G System (5GS); Stage 2 (Release 16)", 3GPP TS 23.501 V16.7.0, Dec. 2020, pp. 1-450.

"Discussion on compatibility issue on failure type for NR SCG failure", 3GPP TSG-RAN WG2 #114-e, R2-2106464, E-meeting, May 19-27, 2021, May 19-27, 2021, pp. 1-2.

"Report of e-mail discussion [AT114-e][022][NR16] RRC II (MediaTek)", 3GPP TSG-RAN WG2 #114-e, R2-2106736, eMeeting, May 19-27, 2021, pp. 1-20.

"3GPP TS 36.331 V16.4.0", 3rd Generation Partnership Project; Technical Specification Group Radio Access Network; Evolved Universal Terrestrial Radio Access (E-UTRA); Radio Resource Control (RRC); Protocol specification (Release 16), Mar. 2021, pp. 1-1087.

"3GPP TS 38.331 V16.4.1", 3rd Generation Partnership Project; Technical Specification Group Radio Access Network; NR; Radio Resource Control (RRC) protocol specification (Release 16), Mar. 2021, pp. 1-949.

"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.

* cited by examiner

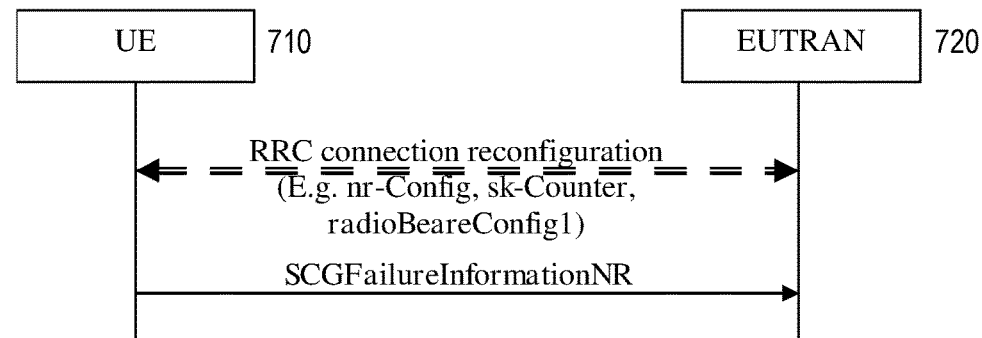

FIG. 7

```
-- ASN1START
SCGFailureInformationNR-r15 ::=        SEQUENCE {
    criticalExtensions                          CHOICE {
        c1                                      CHOICE {
            scgFailureInformationNR-r15         SCGFailureInformationNR-r15-IEs,
            spare3 NULL, spare2 NULL, spare1 NULL
        },
        criticalExtensionsFuture        SEQUENCE {}
    }
}
SCGFailureInformationNR-r15-IEs ::= SEQUENCE {
    failureReportSCG-NR-r15                 FailureReportSCG-NR-r15             OPTIONAL,
    nonCriticalExtension                   SCGFailureInformationNR-v1590-IEs OPTIONAL
}
SCGFailureInformationNR-v1590-IEs ::=   SEQUENCE {
    lateNonCriticalExtension               OCTET STRING                       OPTIONAL,
    nonCriticalExtension                   SEQUENCE {}                        OPTIONAL
}
FailureReportSCG-NR-r15 ::=       SEQUENCE {
    failureType-r15                        ENUMERATED {
                                           t310-Expiry, randomAccessProblem,
                                           rlc-MaxNumRetx, synchReconfigFailureSCG,
                                           scg-reconfigFailure, srb3-IntegrityFailure,
                                           other-r16},
    measResultFreqListNR-r15           MeasResultFreqListFailNR-r15           OPTIONAL,
    measResultSCG-r15                  OCTET STRING                           OPTIONAL,
    ...,
    [[
    locationInfo-r16               LocationInfo-r10                       OPTIONAL,
    logMeasResultListBT-r16        LogMeasResultListBT-r15                OPTIONAL,
    logMeasResultListWLAN-r16      LogMeasResultListWLAN-r15              OPTIONAL,
    failureType-v1610              ENUMERATED {t312-Expiry, scg-lbtFailure,
                                           beamFailureRecoveryFailure, bh-RLF-r16,
                                           spare4, spare3, spare2, spare1} OPTIONAL
    ]]
}
MeasResultFreqListFailNR-r15 ::=    SEQUENCE (SIZE (1..maxFreqNR-r15)) OF
                                           MeasResultFreqFailNR-r15

MeasResultFreqFailNR-r15 ::=       SEQUENCE {
    carrierFreq-r15                    ARFCN-ValueNR-r15,
    measResultCellList-r15             MeasResultCellListNR-r15        OPTIONAL,
    ...
}
-- ASN1STOP
```

FIG. 8

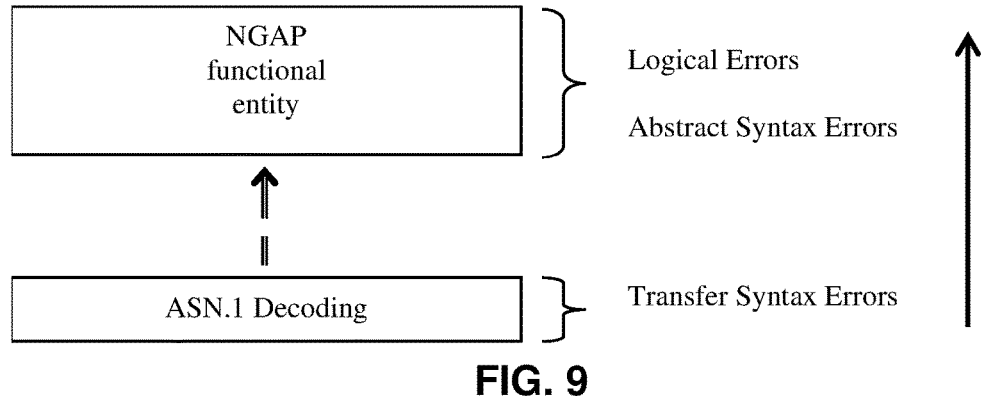

FIG. 9

```
FailureReportSCG-NR-r15 ::= SEQUENCE {
    failureType-r15                  ENUMERATED {
                                         t310-Expiry, randomAccessProblem,
                                         rlc-MaxNumRetx, synchReconfigFailureSCG,
                                         scg-reconfigFailure, srb3-IntegrityFailure
    },
    measResultFreqListNR-r15         MeasResultFreqListFailNR-r15    OPTIONAL,
    measResultSCG-r15                OCTET STRING                    OPTIONAL,
    ...
}
```

FIG. 10

```
FailureReportSCG-NR-r15 ::=    SEQUENCE {
    failureType-r15                  ENUMERATED {
                                         t310-Expiry, randomAccessProblem,
                                         rlc-MaxNumRetx, synchReconfigFailureSCG,
                                         scg-reconfigFailure
                                     },
    measResultFreqListNR-r15         MeasResultFreqListFailNR-r15         OPTIONAL,
    measResultSCG-r15                OCTET STRING                         OPTIONAL,
    ...,
    [[
    locationInfo-r16                 LocationInfo-r10                     OPTIONAL,
    logMeasResultListBT-r16          LogMeasResultListBT-r15              OPTIONAL,
    logMeasResultListWLAN-r16        LogMeasResultListWLAN-r15            OPTIONAL,
    failureType-v1610                ENUMERATED {t312-Expiry, scg-lbtFailure,
                                         beamFailureRecoveryFailure, bh-RLF-r16,
                                         spare4, spare3, spare2, spare1} OPTIONAL
    ]],
    [[
    failureTypeOther-r16             ENUMERATED {other-r16}               OPTIONAL
    ]]
}
```

FIG. 11

```
-- ASN1START
SCGFailureInformationNR-r15 ::=        SEQUENCE {
    criticalExtensions                      CHOICE {
        c1                                  CHOICE {
            scgFailureInformationNR-r15         SCGFailureInformationNR-r15-IEs,
            spare3 NULL, spare2 NULL, spare1 NULL
        },
        criticalExtensionsFuture        SEQUENCE {}
    }
}
SCGFailureInformationNR-r15-IEs ::= SEQUENCE {
    failureReportSCG-NR-r15                 FailureReportSCG-NR-r15           OPTIONAL,
    nonCriticalExtension                    SCGFailureInformationNR-v1590-IEs OPTIONAL
}
SCGFailureInformationNR-v1590-IEs ::= SEQUENCE {
    lateNonCriticalExtension               OCTET STRING                      OPTIONAL,
    nonCriticalExtension                    SCGFailureInformationNR-v16xy-IEs OPTIONAL
}
SCGFailureInformationNR-v16xy-IEs ::=   SEQUENCE {
    failureReportSCG-NR-r16                    FailureReportSCG-NR-r16        OPTIONAL,
    lateNonCriticalExtension                  OCTET STRING                   OPTIONAL,
    nonCriticalExtension                      SEQUENCE {}                    OPTIONAL
}
FailureReportSCG-NR-r15 ::=        SEQUENCE {
    failureType-r15                       ENUMERATED {
                                            t310-Expiry, randomAccessProblem,
                                            rlc-MaxNumRetx, synchReconfigFailureSCG,
                                            scg-reconfigFailure, srb3-IntegrityFailure },
    measResultFreqListNR-r15          MeasResultFreqListFailNR-r15           OPTIONAL,
    measResultSCG-r15                 OCTET STRING                           OPTIONAL,
    ...,
    [[
    locationInfo-r16                  LocationInfo-r10                       OPTIONAL,
    logMeasResultListBT-r16           LogMeasResultListBT-r15                OPTIONAL,
    logMeasResultListWLAN-r16         LogMeasResultListWLAN-r15              OPTIONAL,
    failureType-v1610                 dummy                                  OPTIONAL
    ]]
}
FailureReportSCG-NR-r16 ::=        SEQUENCE {
    failureType-v1610                 ENUMERATED {t312-Expiry, scg-lbtFailure,
                                           beamFailureRecoveryFailure, bh-RLF-r16,
                                           spare4, spare3, spare2, spare1}     OPTIONAL,
    measResultFreqListNR-r15          MeasResultFreqListFailNR-r15           OPTIONAL,
    measResultSCG-r15                 OCTET STRING                           OPTIONAL,
    locationInfo-r16                  LocationInfo-r10                       OPTIONAL,
    logMeasResultListBT-r16           LogMeasResultListBT-r15                OPTIONAL,
    logMeasResultListWLAN-r16         LogMeasResultListWLAN-r15              OPTIONAL,
    ]]
}
MeasResultFreqListFailNR-r15 ::=    SEQUENCE (SIZE (1..maxFreqNR-r15)) OF
                                        MeasResultFreqFailNR-r15
MeasResultFreqFailNR-r15 ::=        SEQUENCE {
    carrierFreq-r15                    ARFCN-ValueNR-r15,
    measResultCellList-r15             MeasResultCellListNR-r15              OPTIONAL,
    ...
}
-- ASN1STOP
```

FIG. 12

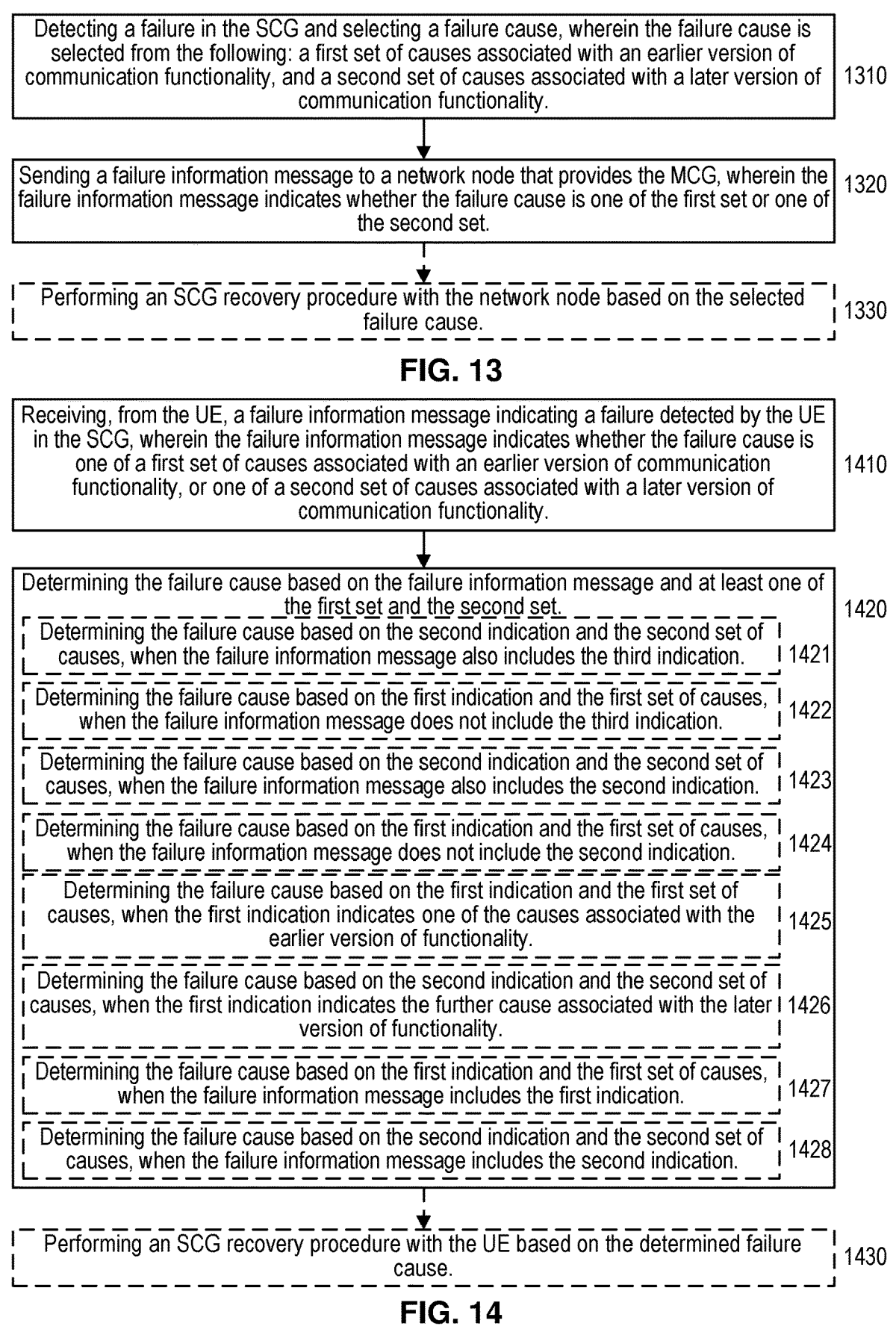

Detecting a failure in the SCG and selecting a failure cause, wherein the failure cause is selected from the following: a first set of causes associated with an earlier version of communication functionality, and a second set of causes associated with a later version of communication functionality. — 1310

Sending a failure information message to a network node that provides the MCG, wherein the failure information message indicates whether the failure cause is one of the first set or one of the second set. — 1320

Performing an SCG recovery procedure with the network node based on the selected failure cause. — 1330

FIG. 13

Receiving, from the UE, a failure information message indicating a failure detected by the UE in the SCG, wherein the failure information message indicates whether the failure cause is one of a first set of causes associated with an earlier version of communication functionality, or one of a second set of causes associated with a later version of communication functionality. — 1410

Determining the failure cause based on the failure information message and at least one of the first set and the second set. — 1420

Determining the failure cause based on the second indication and the second set of causes, when the failure information message also includes the third indication. — 1421

Determining the failure cause based on the first indication and the first set of causes, when the failure information message does not include the third indication. — 1422

Determining the failure cause based on the second indication and the second set of causes, when the failure information message also includes the second indication. — 1423

Determining the failure cause based on the first indication and the first set of causes, when the failure information message does not include the second indication. — 1424

Determining the failure cause based on the first indication and the first set of causes, when the first indication indicates one of the causes associated with the earlier version of functionality. — 1425

Determining the failure cause based on the second indication and the second set of causes, when the first indication indicates the further cause associated with the later version of functionality. — 1426

Determining the failure cause based on the first indication and the first set of causes, when the failure information message includes the first indication. — 1427

Determining the failure cause based on the second indication and the second set of causes, when the failure information message includes the second indication. — 1428

Performing an SCG recovery procedure with the UE based on the determined failure cause. — 1430

FIG. 14

COMMUNICATING FAILURE INFORMATION FOR A SECONDARY CELL GROUP (SCG)

TECHNICAL FIELD

The present invention generally relates to wireless communication networks and particularly relates to techniques when a user equipment (UE) when connected to multiple cell groups in a wireless network and experiences a failure in one of the cell groups.

BACKGROUND

Currently the fifth generation ("5G") of cellular systems, also referred to as New Radio (NR), is being standardized within the Third-Generation Partnership Project (3GPP). NR is developed for maximum flexibility to support a variety of different use cases. These include enhanced mobile broadband (eMBB), machine type communications (MTC), ultra-reliable low latency communications (URLLC), side-link device-to-device (D2D), and several other use cases. While the present disclosure relates primarily to 5G/NR, the following description of fourth-generation Long-Term Evolution (LTE) technology is provided to introduce various terms, concepts, architectures, etc. that are also used in 5G/NR.

LTE is an umbrella term that refers to radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

3GPP LTE Rel-10 supports carrier aggregation (CA) for bandwidths larger than 20 MHz. For backward compatibility with LTE Rel-8, a wideband LTE Rel-10 carrier (e.g., wider than 20 MHz) appears as multiple carriers ("component carriers" or CCs) to a Rel-8 ("legacy") UE. However, Rel-10 UEs can use CA to receive all CCs of a wideband carrier. LTE Rel-12 introduced dual connectivity (DC) whereby a UE is connected to two network nodes simultaneously, thereby improving connection robustness and/or capacity. In LTE DC, these two network nodes are referred to as "Master eNB" (MeNB) and "Secondary eNB" (SeNB), or more generally as master node (MN) and secondary node (SN).

More specifically, a UE is configured with a Master Cell Group (MCG) associated with the MeNB and a Secondary Cell Group (SCG) associated with the SeNB. Each of the CGs is a group of serving cells that includes one MAC entity, a set of logical channels with associated RLC entities, a primary cell (PCell), and optionally one or more secondary cells (SCells). The term "Special Cell" (or "SpCell" for short) refers to the PCell of the MCG or the primary cell of the SCG (PSCell) depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

5G/NR technology shares many similarities with 4G/LTE. For example, both PHYs utilize similar arrangements of time-domain physical resources into 1-ms subframes that include multiple slots of equal duration, with each slot including multiple OFDM-based symbols.

Several DC (or more generally, multi-connectivity) scenarios have been considered for NR. These include NR-DC that is similar to LTE-DC discussed above, except that both the MN and SN (referred to as "gNBs") employ the NR interface to communicate with a UE. In addition, various multi-RAT DC (MR-DC) scenarios have been considered, whereby a compatible UE can be configured to utilize resources provided by two different nodes, one providing E-UTRA/LTE access and the other one providing NR access. One node acts as the MN (e.g., providing MCG) and the other as the SN (e.g., providing SCG), with the MN and SN being connected via a network interface and at least the MN being connected to a core network (e.g., EPC or 5GC).

SUMMARY

In certain MR-DC scenarios with an LTE MN and an NR SN, the UE can initiate an NR SCG failure information procedure to inform the E-UTRAN about a failure in the UE's NR SCG. In this procedure, the UE sends an SCGFailureInformation-NR message that includes a FailureReportSCG-NR information element (IE) with a failureType field that informs the E-UTRAN about the type of failure the UE experienced. However, there are some conditions under which the E-UTRAN can interpret this field erroneously, leading to incorrect operation of the UE and/or the E-UTRAN.

Embodiments of the present disclosure provide specific improvements to SCG management for UEs operating in DC with a wireless network, such as by facilitating solutions to overcome exemplary problems summarized above and described in more detail below.

Some embodiments of the present disclosure include methods (e.g., procedures) for a UE configured to communicate with a wireless network via an MCG and an SCG.

These exemplary methods can include detecting a failure in the SCG and selecting a failure cause. The failure cause can be selected from the following: a first set of causes associated with an earlier version of communication functionality, and a second set of causes associated with a later version of communication functionality. These exemplary methods can also include sending a failure information message to a network node that provides the MCG. The failure information message indicates whether the failure cause is one of the first set or one of the second set. In some embodiments, these exemplary methods can also include performing an SCG recovery procedure with the network node based on the selected failure cause.

In some embodiments, the earlier version of communication functionality corresponds to Rel-15 of 3GPP specifications, and the later version of communication functionality corresponds to Rel-16 of 3GPP specifications. In some embodiments, the network node providing the MCG is an eNB and the message is an SCGFailureInformation-NR message.

In some embodiments, the failure information message indicates whether the failure cause is one of the first set or one of the second set based on including one or more of the following: a first indication of one of the first set of causes, a second indication of one of the second set of causes, and a third indication that the failure cause is indicated by the second indication.

In some of these embodiments, the first indication is a failureType-r15 field of the failure information message, the second indication is a failureType-r16 field of the failure information message, and the third indication is a failureTypeOther-r16 field of the failure information message.

In some of these embodiments, the failure information message includes the first indication and the second indication and the failure information message indicates whether the failure cause is one of the first set or one of the second set based on the following:

including the third indication, which indicates that the failure cause is indicated by the second indication of one of the second set of causes; and excluding the third indication, which indicates that the failure cause is indicated by the first indication of one of the first set of causes.

In other of these embodiments, the failure information message includes the first indication and the failure information message indicates whether the failure cause is one of the first set or one of the second set based on the following:

including the second indication, which indicates that the failure cause is indicated by the second indication of one of the second set of causes; and excluding the second indication, which indicates that the failure cause is indicated by the first indication of one of the first set of causes.

In other of these embodiments, the failure information message includes the first indication and the first set of causes also includes a further cause associated with the later version of communication functionality. In such embodiments, when the first indication indicates the further cause, the failure information message also includes the second indication. Furthermore, the failure information message indicates that the failure cause is one of the second set when the first indication indicates the further cause, and that the failure cause is one of the first set when the first indication indicates one of the causes associated with the earlier version of communication functionality.

In other embodiments, the failure information message includes either the first indication or the second indication and the failure information message indicates whether the failure cause is one of the first set or one of the second set based on the following:

including the first indication, which indicates that the failure cause is indicated by the first indication of one of the first set of causes; and including the second indication, which indicates that the failure cause is indicated by the second indication of one of the second set of causes.

Other embodiments include methods (e.g., procedures) for a network node configured to provide an MCG in a wireless network for a UE that is also configured to communicate with the wireless network via an SCG.

These exemplary methods can include receiving, from the UE, a failure information message indicating a failure detected by the UE in the SCG. The failure information message indicates whether the failure cause is one of a first set of causes associated with an earlier version of communication functionality, or one of a second set of causes associated with a later version of communication functionality. These exemplary methods can also include determining the failure cause based on the failure information message and at least one of the first set and the second set. In some embodiments, these exemplary methods can also include performing an SCG recovery procedure with the UE based on the determined failure cause.

In some embodiments, the earlier version of communication functionality corresponds to Rel-15 of 3GPP specifications, and the later version of communication functionality corresponds to Rel-16 of 3GPP specifications. In some embodiments, the network node that provides the MCG is an eNB and the message is an SCGFailureInformation-NR message.

In some embodiments, the failure information message indicates whether the failure cause is one of the first set or one of the second set based on including one or more of the following: a first indication of one of the first set of causes, a second indication of one of the second set of causes, and a third indication that the failure cause is indicated by the second indication.

In some of these embodiments, the first indication is a failureType-r15 field of the failure information message, the second indication is a failureType-r16 field of the failure information message, and the third indication is a failure-TypeOther-r16 field of the failure information message.

In some of these embodiments, the failure information message includes the first indication and the second indication. In such embodiments, determining the failure cause can include the following: determining the failure cause based on the second indication and the second set of causes, when the failure information message also includes the third indication; and determining the failure cause based on the first indication and the first set of causes, when the failure information message does not include the third indication.

In other of these embodiments, the failure information message includes the first indication. In such embodiments, determining the failure cause can include the following: determining the failure cause based on the second indication and the second set of causes, when the failure information message also includes the second indication; and determining the failure cause based on the first indication and the first set of causes, when the failure information message does not include the second indication.

In other of these embodiments, the failure information message includes the first indication and the first set of causes also includes a further cause associated with the later version of communication functionality. When the first indication indicates the further cause, the failure information message also includes the second indication. In such embodiments, determining the failure cause can include the following: determining the failure cause based on the first indication and the first set of causes, when the first indication indicates one of the causes associated with the earlier version of communication functionality; and determining the failure cause based on the second indication and the second set of causes, when the first indication indicates the further cause associated with the later version of communication functionality.

In other embodiments, the failure information message includes either the first indication or the second indication. In such embodiments, determining the failure cause can include the following: determining the failure cause based on the first indication and the first set of causes, when the failure information message includes the first indication; and determining the failure cause based on the second indication and the second set of causes, when the failure information message includes the second indication.

Other embodiments include UEs (e.g., wireless devices, IoT devices, etc. or component(s) thereof) and network nodes (e.g., base stations, eNBs, gNBs, ng-eNBs, en-gNBs, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other embodiments disclosed herein can avoid, prevent, and/or reduce ASN.1 syntax errors upon receiving the Rel-16 version of certain fields that are not backward compatible with corresponding Rel-15 versions. This provides a benefit of correct operation of the SCG recovery procedure such that UEs avoids RRC reestablishment that results in unwanted delays and connectivity interruptions. At a high level, embodiments can improve DC operations for both UEs and networks.

These and other objects, features, and advantages of embodiments of the present disclosure will become apparent upon reading the following Detailed Description in view of the Drawings briefly described below.

BRIEF DESCRIPTION OF THE DRAWINGS

FIG. 7 shows an exemplary signal flow diagram of an NR SCG failure information procedure between a UE and the E-UTRAN.

FIG. 8 shows an exemplary ASN.1 data structure for an SCGFailureInformationNR message.

FIG. 9 shows an exemplary arrangement of protocol errors in NGAP, which is used on the NG interface between NG-RAN nodes and the 5GC.

FIG. 10 shows an ASN.1 data structure for a 3GPP Rel-15 version of a failureType-r15 field.

FIGS. 11-12 show ASN.1 data structures for various IEs or messages, according to various embodiments of the present disclosure.

FIG. 13 is a flow diagram of another exemplary method (e.g., procedure) for a UE, according to various embodiments of the present disclosure.

FIG. 14 is a flow diagram of an exemplary method (e.g., procedure) for a network node of a wireless network, according to various embodiments of the present disclosure.

DETAILED DESCRIPTION

Figure 1:
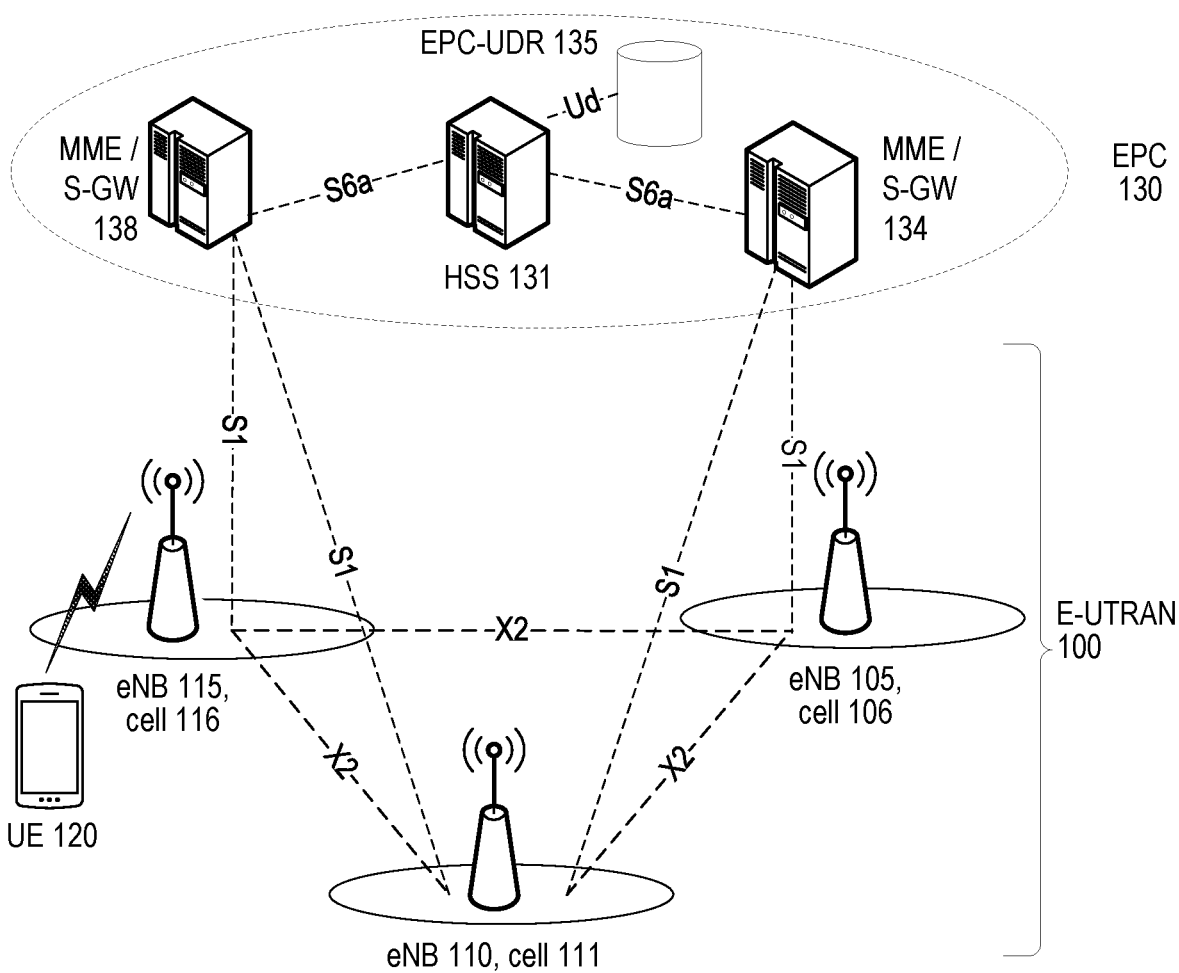
FIG. 1 is a high-level block diagram of an exemplary architecture of the LTE E-UTRAN and EPC network.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP Fifth Generation (5G) NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

Figure 2:
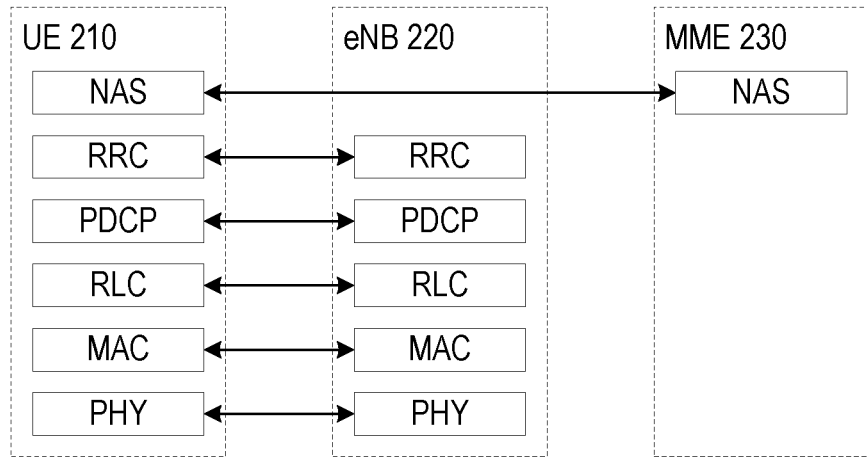
FIG. 2 is a block diagram of exemplary protocol layers of the control-plane portion of the radio (Uu) interface between a UE and the E-UTRAN.

FIG. 2 illustrates a block diagram of an exemplary control plane (CP) protocol stack between a UE (210), an eNB (220), and an MME (230). The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CON-NECTED state.

In LTE dual connectivity (DC), the MeNB provides system information (SI) and terminates the control plane connection towards the UE and, as such, is the controlling node of the UE, including handovers to and from SeNBs. For example, the MeNB terminates the connection between the eNB and the Mobility Management Entity (MME) for the UE. An SeNB provides additional radio resources (e.g., bearers) for radio resource bearers include MCG bearers, SCG bearers, and split bearers that have resources from both MCG and SCG. The reconfiguration, addition, and removal of SCells can be performed by RRC signaling. When adding a new SCell, dedicated RRC signaling is used to send the UE all required SI of the SCell, such that UEs need not acquire SI directly from the SCell broadcast. It is also possible to support CA in either or both of MCG and SCG. In other words, either or both of the MCG and the SCG can include multiple cells working in CA.

Both MeNB and SeNB can terminate the user plane (UP) to the UE. The LTE DC UP includes three different types of bearers. MCG bearers are terminated in the MeNB, and the S1-U connection for the corresponding bearer(s) to the S-GW is terminated in the MeNB. SeNB is not involved in the transport of UP data for MCG bearers. Likewise, SCG bearers are terminated in the SeNB, which can be directly connected with the S-GW via S1-U. MeNB is not involved in the transport of UP data for SCG bearers. An S1-U connection between S-GW and SeNB is only present if SCG bearers are configured. Finally, split bearers (and their corresponding S1-U connections to S-GW) are also termi-nated in the MeNB, but PDCP data is transferred between MeNB and SeNB via X2-U. SeNB and MeNB are involved in transmitting data for split bearers.

Figure 3:
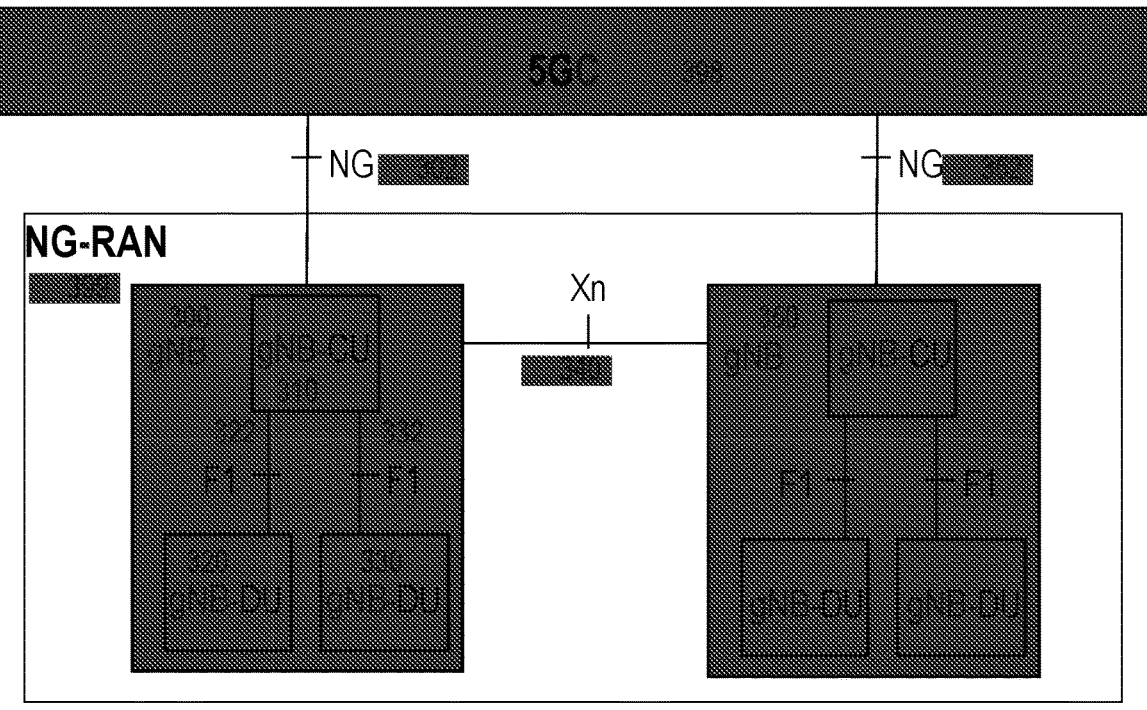
FIG. 3 shows a high-level views of an exemplary 5G/NR network architecture.

FIG. 3 illustrates a high-level view of the 5G network architecture, consisting of a Next Generation RAN (NG-RAN) 399 and a 5G Core (5GC) 398. NG-RAN 399 can include a set of gNodeB's (gNBs) connected to the 3GC via one or more NG interfaces, such as gNBs 300, 350 con-nected via interfaces 302, 352, respectively. In addition, the gNBs can be connected to each other via one or more Xn interfaces, such as Xn interface 340 between gNBs 300 and 350. With respect to the NR interface to UEs, each of the gNBs can support frequency division duplexing (FDD), time divi-sion duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL pro-vides services for user plane transport and signaling trans-port. In some exemplary configurations, each gNB is con-nected to all 5GC nodes within an "AMF Region," which is defined in 3GPP TS 23.501. If security protection for CP and UP data on TNL of NG-RAN interfaces is supported, NDS/IP shall be applied.

The NG RAN logical nodes shown in FIG. 3 include a central (or centralized) unit (CU or gNB-CU) and one or more distributed (or decentralized) units (DU or gNB-DU). For example, gNB 300 includes gNB-CU 310 and gNB-DUs 320 and 330. CUs (e.g., gNB-CU 310) are logical nodes that host higher-layer protocols and perform various gNB func-tions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver cir-cuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 322 and 332 shown in FIG. 3. The gNB-CU and connected gNB-DUs are only visible to other gNBs and the 5GC as a gNB. In other words, the F1 interface is not visible beyond gNB-CU. In the gNB split CU-DU architecture illustrated by FIG. 3, DC can be achieved by allowing a UE to connect to multiple DUs served by the same CU or by allowing a UE to connect to multiple DUs served by different CUs.

3GPP TR 38.804 (v14.0.0) describes various exemplary dual-connectivity (DC) scenarios or configurations in which the MN and SN can apply either NR, LTE, or both. The following terminology is used to describe these exemplary DC scenarios or configurations:

DC: LTE DC (i.e., both MN and SN employ LTE, as discussed above);

EN-DC: LTE-NR DC where MN (eNB) employs LTE and SN (gNB) employs NR, and both are connected to EPC.

NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.

NE-DC: LTE-NR dual connectivity where a UE is con-nected to one gNB that acts as a MN and one ng-eNB that acts as a SN. The gNB is connected to 5GC and the ng-eNB is connected to the gNB via the Xn interface.

NR-DC (or NR-NR DC): both MN and SN employ NR.

MR-DC (multi-RAT DC): a generalization of the Intra-E-UTRA Dual Connectivity (DC) described in TS 36.300, where a multiple Rx/Tx UE may be configured to utilize resources provided by two different nodes connected via non-ideal backhaul, one providing E-UTRA access and the other one providing NR access. One node acts as the MN and the other as the SN. The MN and SN are connected via a network interface and at least the MN is connected to the core network. EN-DC, NE-DC, and NGEN-DC are different example cases of MR-DC.

Figure 4:
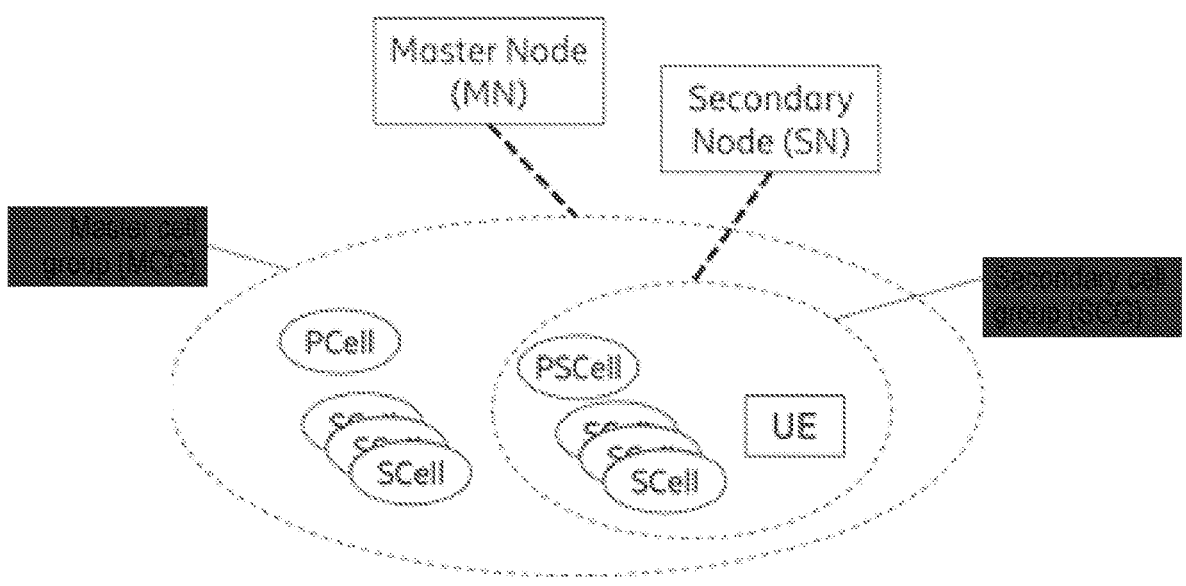
FIG. 4 shows a high-level illustration of DC in combination with carrier aggregation (CA).

FIG. 4 shows a high-level illustration of DC in combi-nation with carrier aggregation. In this illustration, each of the MN and the SN can be either an eNB or a gNB, in accordance with the various DC scenarios mentioned above. The MN provides the MCG consisting of a PCell and three SCells arranged in CA, while the SN provides the SCG consisting of a PSCell and three SCells arranged in CA.

Figure 5:
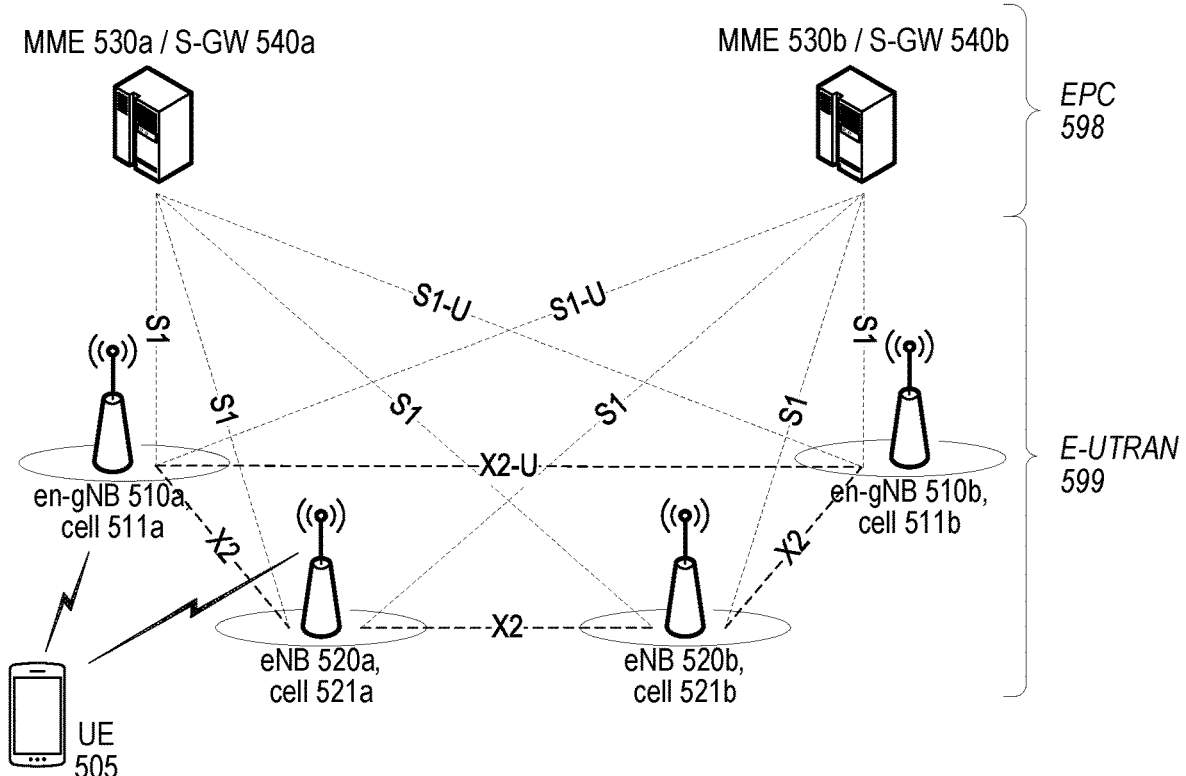
FIGS. 5-6 show high-level views of exemplary network architectures that support multi-RAT DC (MR-DC) using EPC and 5GC, respectively.

FIG. 5 shows a high-level view of an exemplary network architecture that supports EN-DC, including an E-UTRAN 599 and an EPC 598. As shown in the figure, E-UTRAN 599 can include en-gNBs (e.g., 510*a,b*) and eNBs (e.g., 520*a,b*) that are interconnected with each other via respective X2 (or X2-U) interfaces. The eNBs can be similar to those shown in FIG. 1, while the ng-eNBs can be similar to the gNBs shown in FIG. 3 except that they connect to EPC via an S1-U interface rather than to 5GC via an X2 interface. The eNBs also connect to EPC via an S1 interface, similar to the arrangement shown in FIG. 1. More specifically, en-gNBs (e.g., 510*a,b*) and eNBs 520 (e.g., 520*a,b*) connect to MMEs (e.g., 530*a,b*) and S-GWs (e.g., 540*a,b*) in EPC.

Each of the en-gNBs and eNBs can serve a geographic coverage area including one more cells, including cells 511a-b and 521a-b shown as exemplary in FIG. 5. Depending on the cell in which it is located, a UE (e.g., 505) can communicate with the en-gNB or eNB serving that cell via the NR or LTE radio interface, respectively. In addition, a UE can be in EN-DC connectivity with a first cell served by an eNB and a second cell served by an en-gNB, such as UE 505 in EN-DC with cells 520a and 510a in FIG. 5.

In addition to providing coverage via "cells," as in LTE, NR networks also provide coverage via "beams." In general, a DL "beam" is a coverage area of a network-transmitted RS that may be measured or monitored by a UE. In NR, for example, such RS can include any of the following, alone or in combination: SS/PBCH block (SSB), CSI-RS, tertiary reference signals (or any other sync signal), positioning RS (PRS), DMRS, phase-tracking reference signals (PTRS), etc. In general, SSB is available to all UEs regardless of RRC state, while other RS (e.g., CSI-RS, DM-RS, PTRS) are associated with specific UEs that have a network connection, i.e., in RRC_CONNECTED state.

Figure 6:
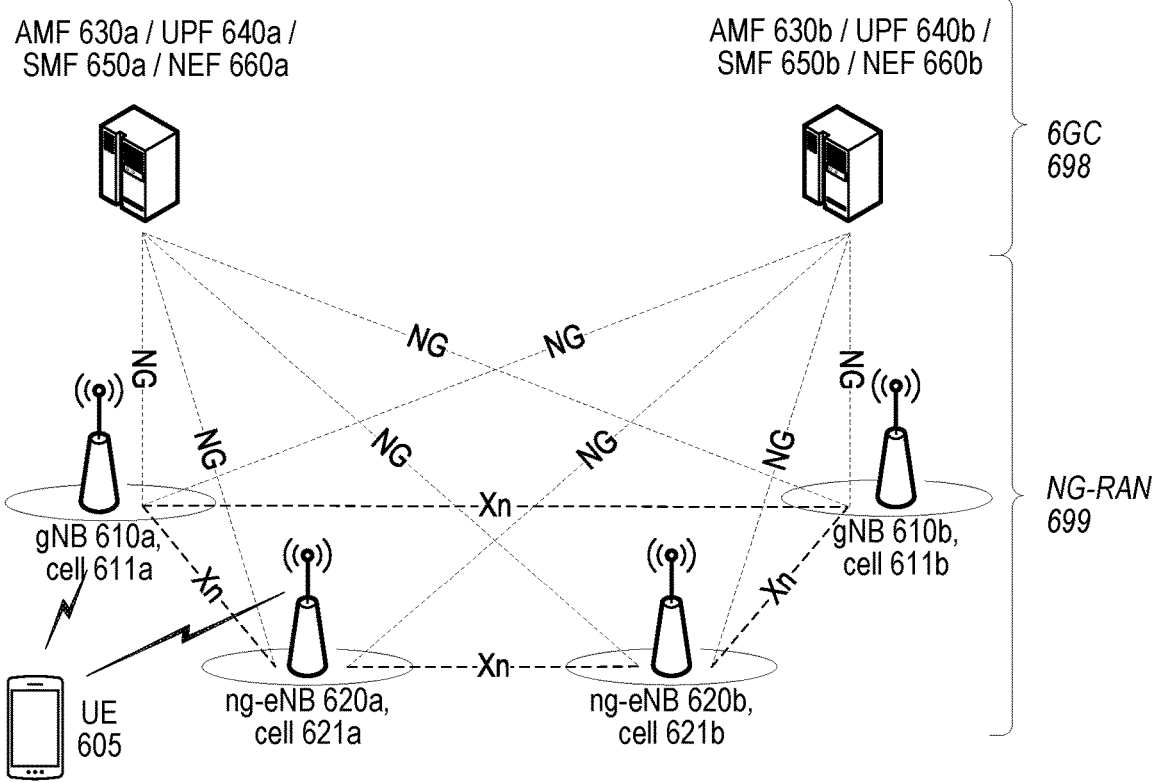

FIG. 6 shows a high-level view of an exemplary network architecture that supports MR-DC configurations based on a 5GC. More specifically, FIG. 6 shows an NG-RAN 699 and a 5GC 698. NG-RAN 699 can include gNBs (e.g., 610a,b) and ng-eNBs (e.g., 620a,b) that are interconnected with each other via respective Xn interfaces. The gNBs and ng-eNBs are also connected via the NG interfaces to 6GC 698, more specifically to the access and mobility management functions (AMFs, e.g., 630a,b) via respective NG-C interfaces and to the user plane functions (UPFs, e.g., 640a,b) via respective NG-U interfaces. Moreover, the AMFs can communicate with one or more session management functions (SMFs, e.g., 650a,b) and network exposure functions (NEFs, e.g., 660a,b).

Each of the gNBs can be similar to those shown in FIG. 5, while each of the ng-eNBs can be similar to the eNBs shown in FIG. 1 except that they connect to 5GC via an NG interface rather than to EPC via an S1 interface. Each of the gNBs and ng-eNBs can serve a geographic coverage area including one more cells, including cells 611a-b and 621a-b shown as exemplary in FIG. 6. The gNBs and ng-eNBs can also use various directional beams to provide coverage in the respective cells. Depending on the cell in which it is located, a UE can communicate with the gNB or ng-eNB serving that cell via the NR or LTE radio interface, respectively. In addition, a UE can be in MR-DC with a first cell served by an ng-eNB and a second cell served by a gNB, such as UE 605 in MR-DC with cells 620a and 610a in FIG. 6.

FIG. 7 shows an exemplary signal flow diagram of an NR SCG failure information procedure between a UE and the E-UTRAN, such as when the UE is in EN-DC or NGEN-DC. The following exemplary text from 3GPP TS 36.331 (v16.4.0) describes UE and network operations associated with FIG. 7. Text of particular interest to the present discussion is underlined below.

*Begin Text from 3GPP TS 36.331*

5.6.13a NR SCG Failure Information 5.6.13a.1 General

The purpose of this procedure is to inform E-UTRAN about an SCG failure the UE has experienced (e.g., SCG radio link failure, failure to successfully complete an SCG reconfiguration with sync), as specified in TS 38.331 [82], clause 5.7.3.2.

5.6.13a.2 Initiation

A UE initiates the procedure to report NR SCG failures when neither E-UTRA MCG nor NR SCG transmission is not suspended and in accordance with TS 38.331 [82], clause 5.7.3.2. Actions the UE shall perform upon initiating the procedure, other than related to the transmission of the SCGFailureInformationNR message are specified in TS 38.331 [82], clause 5.7.3.2.

5.6.13a.3 Actions Related to Transmission of SCGFailureInformationNR Message

The UE shall set the contents of the SCGFailureInformationNR message as follows:

1> include failureType within failureReportSCG-NR and set it to indicate the SCG failure in accordance with TS 38.331 [82], clause 5.7.3.3;

NOTE 1: This may involve including both failureType-r15 and failureType-v1610, see TS 38.331 [82], clause 5.7.3.3.

1> include and set measResultSCG in accordance with TS 38.331 [82], clause 5.7.3.4;

1> for each NR frequency the UE is configured to measure by measConfig for which measurement results are available:

2> set the measResultFreqListNR to include the best measured cells, ordered such that the best cell is listed first using RSRP to order if RSRP measurement results are available for cells on this frequency, otherwise using RSRQ to order if RSRQ measurement results are available for cells on this frequency, otherwise using SINR to order, and based on measurements collected up to the moment the UE detected the failure, and for each cell that is included, include the optional fields that are available;

NOTE 2: Field measResultSCG is used to report available results for NR frequencies the UE is configured to measure by NR RRC signalling.

1> if detailed location information is available, set the content of the locationInfo as follows:

2> include the locationCoordinates;

2> include the horizontalVelocity, if available;

1> if available, set the logMeasResultListWLANto include the WLAN measurement results, in order of decreasing RSSI for WLAN APs;

1> if available, set the logMeasResultListBT to include the Bluetooth measurement results, in order of decreasing RSSI for Bluetooth beacons;

The UE shall submit the SCGFailureInformationNR message to lower layers for transmission.

*End Text from 3GPP TS 36.331*

FIG. 8 shows an exemplary ASN.1 data structure for the SCGFailureInformationNR message mention in the above text. The SCGFailureInformationNR message is used to provide information regarding NR SCG failures detected by the UE. Table 2 below provides descriptions of various fields of this message.

TABLE 2

| Field/IE | Description |
|---|---|
| failureType | Indicates the cause of the SCG failure |
| measResultFreqListNR | The field contains available results of measurements on NR frequencies the UE is configured to measure by MeasConfig. |
| measResultSCG | Includes the NR MeasResultSCG-Failure IE as specified in 3GPP TS 38.331. The field contains available results of measurements on NR frequencies the UE is configured to measure by the NR RRCConfiguration message. |

The following text from 3GPP TS 38.331 (v16.4.1) describes how the UE determines the value for the failure-Type field.

*Begin Text from 3GPP TS 38.331*

5.7.3.3 Failure Type Determination for (NG)EN-DC

The UE shall set the SCG failure type as follows:

1> if the UE initiates transmission of the SCGFailure-InformationNR message due to T310 expiry:
 2> set the failureType as t310-Expiry;
1> else if the UE initiates transmission of the SCGFail-ureInformationNR message due to T312 expiry:
 2> set the failureType as other and set the failure-Type-v1610 as t312-Expiry;
1> else if the UE initiates transmission of the SCGFail-ureInformationNR message to provide reconfigura-tion with sync failure information for an SCG;
 2> set the failureType as synchReconfigFailure-SCG;
1> else if the UE initiates transmission of the SCGFail-ureInformationNR message to provide random access problem indication from SCG MAC:
 2> if the random access procedure was initiated for beam failure recovery:
  3> set the failureType as other and set the failure-Type-v1610 as beamFailureRecoveryFailure;
 2> else:
  3> set the failureType as randomAccessProblem;
1> else if the UE initiates transmission of the SCGFail-ureInformationNR message to provide indication from SCG RLC that the maximum number of retransmissions has been reached:
 2> set the failureType as rlc-MaxNumRetx;
1> else if the UE initiates transmission of the SCGFail-ureInformationNR message due to SRB3 integrity check failure:
 2> set the failureType as srb3-IntegrityFailure;
1> else if the UE initiates transmission of the SCGFail-ureInformationNR message due to Reconfiguration failure of NR RRC reconfiguration message:
 2> set the failureType as scg-reconfigFailure.
1> else if the UE initiates transmission of the SCGFail-ureInformationNR message due to consistent uplink LBT failures:
 2> set the failureType as other and set the failure-Type-v1610 as scg-lbtFailure;
1> else if connected as an IAB-node and the SCGFail-ureInformationNR is initiated due to the reception of a BH RLF indication on BAP entity from the SCG:
 2> set the failureType as other and set failureType-v1610 as bh-RLF.

*End Text from 3GPP TS 38.331*

There are some situations in which information encoded in an ASN.1 data structure, such as shown in FIG. 8, by a transmitting entity can be incorrectly decoded by a receiving entity. These are referred to as "protocol errors" and can be divided into three primary types: transfer syntax errors, abstract syntax errors, and logical errors. FIG. 9 shows an exemplary arrangement of protocol errors in NGAP, which is used on the NG interface between NG-RAN nodes and 5GC.

Transfer syntax errors occur when the receiver is not able to decode the received physical message. Transfer syntax errors are always detected in the process of ASN.1 decoding. If a transfer syntax error occurs, the receiver should initiate Error Indication procedure with appropriate cause value for the transfer syntax error. Examples of transfer syntax errors include the following:

Violation of value ranges in ASN.1 definition of mes-sages. For example, if an IE has a defined value range of 0 to 10 (ASN.1: INTEGER (0 . . . 10)) and a value of 12 is received.

Violation in list element constraints. For example, if a list is defined as containing 1 to 10 elements and 12 elements are received.

Missing mandatory elements in ASN.1 SEQUENCE defi-nitions (as sent by the originator of the message).

Wrong order of elements in ASN.1 SEQUENCE defini-tions (as sent by the originator of the message).

Abstract syntax errors occur in any of the following cases:

1. The receiving entity receives IEs or IE groups that cannot be understood (unknown IE ID);
2. The receiving entity receives IEs for which the logical range is violated (e.g., ASN.1 definition: 0 to 15, the logical range is 0 to 10 while values 11 to 15 are undefined, and 12 is received);
3. The receiving entity does not receive IEs or IE groups but according to the specified presence of the concern-ing object, the IEs or IE groups should have been present in the received message;
4. The receiving entity receives IEs or IE groups that are defined to be part of that message in wrong order or with too many occurrences of the same IE or IE group; or
5. The receiving entity receives IEs or IE groups but according to the conditional presence of the concerning object and the specified condition, the IEs or IE groups should not have been present in the received message.

Cases 1 and 2 (not comprehended IE/IE group) are handled based on criticality information sent by the origi-nator of the message. NGAP messages include criticality information for individual IEs and/or IE groups. This criti-cality information instructs the receiver how to act when receiving an IE or an IE group that is not comprehended, i.e., the entire item (IE or IE group) which is not (fully or partially) comprehended shall be treated in accordance with its own criticality information. In addition, the criticality information is used in case of the missing IE/IE group abstract syntax error. The receiving node shall take different actions depending on the value of the Criticality Informa-tion. The three possible values of the Criticality Information for an IE/IE group are reject IE, ignore IE and notify sender, and ignore IE.

The following rules restrict when a receiving entity may consider an IE, an IE group, or an EP not comprehended (not implemented), and when action based on criticality infor-mation is applicable:

IE or IE group: When one new or modified IE or IE group is implemented for one EP from a standard version, then other new or modified IEs or IE groups specified for that EP in that standard version shall be considered comprehended by a receiving entity (some may still remain unsupported).

EP: The comprehension of different EPs within a standard version or between different standard versions is not mandated. Any EP that is not supported may be con-sidered not comprehended, even if another EP from that standard version is comprehended, and action based on criticality shall be applied.

Different types of non-comprehended IEs or IE groups may be treated differently. For example, the following rules apply to Procedure Code IEs:

If a message is received with a Procedure Code IE marked with "Reject IE" which the receiving node does not comprehend, the receiving node shall reject the procedure using the Error Indication procedure.

If a message is received with a Procedure Code IE marked with "Ignore IE and Notify Sender" which the receiving node does not comprehend, the receiving node shall ignore the procedure and initiate the Error Indication procedure.

If a message is received with a Procedure Code IE marked with "Ignore IE" which the receiving node does not comprehend, the receiving node shall ignore the procedure.

When using the Error Indication procedure to reject a procedure or to report an ignored procedure it shall include the Procedure Code IE, the Triggering Message IE, and the Procedure Criticality IE in the Criticality Diagnostics IE.

Additionally, when the receiving node cannot decode a Type of Message IE, the Error Indication procedure shall be initiated with an appropriate cause value. As another example, the following rules apply to IEs other than Procedure Code IEs and Type of Message IEs:

If a message initiating a procedure is received containing one or more IEs/IE group marked with "Reject IE" which the receiving node does not comprehend; none of the functional requests of the message shall be executed. The receiving node shall reject the procedure and report the rejection of one or more IEs/IE group using the message normally used to report unsuccessful outcome of the procedure. In case the information received in the initiating message was insufficient to determine a value for all IEs that are required to be present in the message used to report the unsuccessful outcome of the procedure, the receiving node shall instead terminate the procedure and initiate the Error Indication procedure.

If a message initiating a procedure that does not have a message to report unsuccessful outcome is received containing one or more IEs/IE groups marked with "Reject IE" which the receiving node does not comprehend, the receiving node shall terminate the procedure and initiate the Error Indication procedure.

If a response message is received containing one or more IEs marked with "Reject IE", that the receiving node does not comprehend, the receiving node shall consider the procedure as unsuccessfully terminated and initiate local error handling.

If a message initiating a procedure is received containing one or more IEs/IE groups marked with "Ignore IE and Notify Sender" which the receiving node does not comprehend, the receiving node shall ignore the content of the not comprehended IEs/IE groups, continue with the procedure as if the not comprehended IEs/IE groups were not received (except for the reporting) using the understood IEs/IE groups, and report in the response message of the procedure that one or more IEs/IE groups have been ignored. In case the information received in the initiating message was insufficient to determine a value for all IEs that are required to be present in the response message, the receiving node shall instead terminate the procedure and initiate the Error Indication procedure.

if a message initiating a procedure that does not have a message to report the outcome of the procedure is received containing one or more IEs/IE groups marked with "Ignore IE and Notify Sender" which the receiving node does not comprehend, the receiving node shall ignore the content of the not comprehended IEs/IE groups, continue with the procedure as if the not comprehended IEs/IE groups were not received (except for the reporting) using the understood IEs/IE groups, and initiate the Error Indication procedure to report that one or more IEs/IE groups have been ignored.

If a response message is received containing one or more IEs/IE groups marked with "Ignore IE and Notify Sender" which the receiving node does not comprehend, the receiving node shall ignore the content of the not comprehended IEs/IE groups, continue with the procedure as if the not comprehended IEs/IE groups were not received (except for the reporting) using the understood IEs/IE groups and initiate the Error Indication procedure.

If a message initiating a procedure is received containing one or more IEs/IE groups marked with "Ignore IE" which the receiving node does not comprehend, the receiving node shall ignore the content of the not comprehended IEs/IE groups and continue with the procedure as if the not comprehended IEs/IE groups were not received using the understood IEs/IE groups.

If a response message is received containing one or more IEs/IE groups marked with "Ignore IE" which the receiving node does not comprehend, the receiving node shall ignore the content of the not comprehended IEs/IE groups and continue with the procedure as if the not comprehended IEs/IE groups were not received using the understood IEs/IE groups.

When reporting not comprehended IEs/IE groups marked with "Reject IE" or "Ignore IE and Notify Sender" using a response message defined for the procedure, the Information Element Criticality Diagnostics IE shall be included in the Criticality Diagnostics IE for each reported IE/IE group. On the other hand, when reporting not comprehended IEs/IE groups marked with "Reject IE" or "Ignore IE and Notify Sender" using the Error Indication procedure, the Procedure Code IE, the Triggering Message IE, Procedure Criticality IE, and the Information Element Criticality Diagnostics IE shall be included in the Criticality Diagnostics IE for each reported IE/IE group.

Case 3 (missing IE/IE group) is handled based on criticality information and presence information for the missing IE/IE group specified in the version of the specification used by the receiver. For many IEs/IE groups that are optional according to the ASN.1 transfer syntax, NGAP specifies separately if the presence of these IEs/IE groups is optional or mandatory with respect to RNS application by means of the presence field of the concerning object of class NGAP-PROTOCOL-IES, NGAP-PROTOCOL-IES-PAIR, NGAP-PROTOCOL-EXTENSION or NGAP-PRIVATE-IES.

The presence field of the indicated classes supports three values: optional, conditional, and mandatory. If an IE/IE group is not included in a received message and the presence of the IE/IE group is mandatory or the presence is conditional and the condition is true according to the version of the specification used by the receiver, an abstract syntax error occurs due to a missing IE/IE group. If an IE/IE group is included in a received message and the presence of the IE/IE group is conditional and the condition is false according to the version of the specification used by the receiver, an abstract syntax error occurs due to this erroneously present conditional IE/IE group. Additionally, the receiver shall handle the missing IE or IE group according to criticality information according to the following rules:

If a received message initiating a procedure is missing one or more IEs/IE groups with specified criticality "Reject IE"; none of the functional requests of the message shall be executed. The receiving node shall reject the procedure and report the missing IEs/IE groups using the message normally used to report unsuccessful outcome of the procedure. In case the information received in the initiating message was insufficient to determine a value for all IEs that are required to be present in the message used to report the unsuccessful outcome of the procedure, the receiving node shall instead terminate the procedure and initiate the Error Indication procedure.

If a received message initiating a procedure that does not have a message to report unsuccessful outcome is missing one or more IEs/IE groups with specified criticality "Reject IE", the receiving node shall terminate the procedure and initiate the Error Indication procedure.

If a received response message is missing one or more IEs/IE groups with specified criticality "Reject IE, the receiving node shall consider the procedure as unsuccessfully terminated and initiate local error handling.

If a received message initiating a procedure is missing one or more IEs/IE groups with specified criticality "Ignore IE and Notify Sender", the receiving node shall ignore that those IEs are missing and continue with the procedure based on the other IEs/IE groups present in the message and report in the response message of the procedure that one or more IEs/IE groups were missing. In case the information received in the initiating message was insufficient to determine a value for all IEs that are required to be present in the response message, the receiving node shall instead terminate the procedure and initiate the Error Indication procedure.

If a received message initiating a procedure that does not have a message to report the outcome of the procedure is missing one or more IEs/IE groups with specified criticality "Ignore IE and Notify Sender", the receiving node shall ignore that those IEs are missing and continue with the procedure based on the other IEs/IE groups present in the message and initiate the Error Indication procedure to report that one or more IEs/IE groups were missing.

If a received response message is missing one or more IEs/IE groups with specified criticality "Ignore IE and Notify Sender", the receiving node shall ignore that those IEs are missing and continue with the procedure based on the other IEs/IE groups present in the message and initiate the Error Indication procedure to report that one or more IEs/IE groups were missing.

If a received message initiating a procedure is missing one or more IEs/IE groups with specified criticality "Ignore IE", the receiving node shall ignore that those IEs are missing and continue with the procedure based on the other IEs/IE groups present in the message.

If a received response message is missing one or more IEs/IE groups with specified criticality "Ignore IE", the receiving node shall ignore that those IEs/IE groups are missing and continue with the procedure based on the other IEs/IE groups present in the message.

When reporting missing IEs/IE groups with specified criticality "RejectIE" or "Ignore IE and Notify Sender" using a response message defined for the procedure, the Information Element Criticality Diagnostics IE shall be included in the Criticality Diagnostics IE for each reported IE/IE group. On the other hand, when reporting missing IEs/IE groups with specified criticality "Reject IE" or "Ignore IE and Notify Sender" using the Error Indication procedure, the Procedure Code IE, the Triggering Message IE, Procedure Criticality IE, and the Information Element Criticality Diagnostics IE shall be included in the Criticality Diagnostics IE for each reported IE/IE group.

Case 4 (IEs or IE groups in wrong order or with too many occurrences) and Case 5 (erroneously present conditional IEs or IE groups) result in rejecting the procedure. In particular, the following rules apply when a message with IEs or IE groups in wrong order or with too many occurrences is received or if IEs or IE groups with a conditional presence are present when the condition is not met (i.e., erroneously present):

If a message initiating a procedure is received containing IEs or IE groups in wrong order or with too many occurrences or erroneously present, none of the functional requests of the message shall be executed. The receiving node shall reject the procedure and report the cause value "Abstract Syntax Error (Falsely Constructed Message)" using the message normally used to report unsuccessful outcome of the procedure. In case the information received in the initiating message was insufficient to determine a value for all IEs that are required to be present in the message used to report the unsuccessful outcome of the procedure, the receiving node shall instead terminate the procedure and initiate the Error Indication procedure.

If a message initiating a procedure that does not have a message to report unsuccessful outcome is received containing IEs or IE groups in wrong order or with too many occurrences or erroneously present, the receiving node shall terminate the procedure and initiate the Error Indication procedure, and use cause value "Abstract Syntax Error (Falsely Constructed Message)".

If a response message is received containing IEs or IE groups in wrong order or with too many occurrences or erroneously present, the receiving node shall consider the procedure as unsuccessfully terminated and initiate local error handling.

When determining the correct order only the IEs specified in the specification version used by the receiver shall be considered.

Logical errors shown in FIG. 9 occur when an NGAP message is comprehended correctly by the receiver, but the information within the message is not valid (i.e., semantic error) or describes a procedure which is not compatible with the state of the receiver. In these conditions, the handling is defined based on the class of the elementary procedure that includes the message, irrespective of the criticality information of the IEs/IE groups containing the erroneous values.

When the logical error occurs in a request message of a class 1 procedure, and the procedure has a message to report this unsuccessful outcome, this message shall be sent with an appropriate cause value. Typical cause values include semantic error and message not compatible with receiver state. When the logical error occurs in a request message of a class 1 procedure, and the procedure does not have a message to report this unsuccessful outcome, the procedure shall be terminated and the Error Indication procedure shall be initiated with an appropriate cause value. The Procedure Code IE and the Triggering Message IE within the Criticality Diagnostics IE shall then be included in order to identify the message containing the logical error. When the logical error occurs in a response message of a class 1 procedure, the procedure shall be considered as unsuccessfully terminated and local error handling shall be initiated.

When the logical error occurs in a message of a class 2 procedure, the procedure shall be terminated and the Error Indication procedure shall be initiated with an appropriate cause value. The Procedure Code IE and the Triggering Message IE within the Criticality Diagnostics IE shall then be included in order to identify the message containing the logical error.

The error handling for all the cases described above is also subject to the following rules:

If any type of error (Transfer Syntax Error, Abstract Syntax Error or Logical Error) is detected in an Error Indication message, the receiver shall perform local error handling rather than the Error Indication procedure.

In case a response message or Error Indication message needs to be returned, but the information necessary to determine the receiver of that message is missing, the procedure shall be considered as unsuccessfully terminated and local error handling shall be initiated.

If an error that terminates a procedure occurs, the returned cause value shall reflect the error that caused the termination of the procedure even if one or more abstract syntax errors with criticality "ignore and notify" have earlier occurred within the same procedure.

When a UE is in EN-DC or NGEN-DC and the UE experiences an NR SCG radio link failure (RLF), it sends the SCGFailureInformationNR message shown in FIG. 8 to the MeNB. This message includes different failureType fields— failureType-r15 and failureType-r16—that relate to different RLF scenarios identified during Rel-15 and Rel-16 standardization.

Note that the failureType-r15 field shown in FIG. 8 is the Rel-16 version of that field. In contrast, FIG. 10 shows an ASN.1 data structure for the Rel-15 version of the failure-Type-r15 field. One notable difference is the Rel-16 version of failureType-r15 has seven (7) entries while the Rel-15 version of failureType-r15 has only six (6) entries. The reason for this is because in Rel-16 a new failure cause was added (i.e., other-r16) in a non-backward compatible way with respect to Rel-15.

As a result, a Rel-15 eNB does not have any knowledge of the possibility for a UE to signal the Rel-16 version of field failureType-r15 with the value "other-r16". In fact, the Rel-15 version of failureType-r15 includes no spare values that can be used in later releases. One consequence is that when a Rel-16 UE includes the field failureType-r15 with the value "other-r16" and sends it to a Rel-15 eNB, the Rel-15 eNB will consider the entire SCGFailureInformationNR message as invalid according to the rules discussed above and will trigger an ASN.1 syntax error.

This also means that the SCGFailureInformationNR message will not be decoded and no RLF recovery will be possible. As such, the UE must perform connection reestablishment which requires a long delay and interruption to connectivity with the network. This can be problematic for various applications running on the UE that rely on such connectivity. Moreover, a Rel-16 UE must do this every time it sends a Rel-16 version of failureType-r15 with the value "other-r16" to a Rel-15 eNB. In such cases, the SCG recovery mechanism will not work at all.

Embodiments of the present disclosure address these and other problems, difficulties, or issues by providing techniques whereby a Rel-15 eNB can correctly decode the Rel-16 version of the SCGFailureInformationNR message when this is sent by a Rel-16 UE including the Rel-16 version of the field failureType-r15 (with or without the value "other-r16"). Based on these techniques, the Rel-15 eNB will not trigger any ASN.1 syntax errors upon receiving the Rel-16 version of the field failureType-r15 with the value "other-r16" and will correctly decode the SCGFailureInformationNR message, except for the field failureType-r15. This provides the benefit of correct operation of the SCG recovery procedure for which the SCGFailureInformationNR message is intended such that the UE avoids RRC reestablishment procedure that results in unwanted delays and connectivity interruptions.

In general, embodiments relate to the scenario in which a Rel-16 UE experiences a RLF with a cause that was first standardized for Rel-16. Thus, when sending the SCGFailureInformationNR message to the Rel-15 (M)eNB, the UE includes a failure cause with the suffix "-r16".

In some embodiments, the failureType-r15 field in the Rel-16 version of the SCGFailureInformationNR message can be changed to match the same number of codepoints (i.e., failure types) as in the Rel-15 version of the SCGFailureInformationNR message. For example, the "other-r16" value can be removed. Additionally, one of the following options can be used together with the failureType-r15 field arranged in this manner.

In a first option, the value "other-r16" can added to a new field in the Rel-16 version of the SCGFailureInformationNR message. For example, this field can be called failureTypeOther-r16 and can be optionally included when the Rel-16 UE needs to signal a Rel-16 failure cause. FIG. 11 shows an ASN.1 data structure for an exemplary FailureReportSCG-NR IE that includes failureType-r15 and failureTypeOther-r16 fields in accordance with these embodiments. In other words, when the Rel-16 UE includes a Rel-16 failure cause in an SCGFailureInformationNR message to the MeNB, it includes a failureTypeOther-r16 field with value "other-r16" and also the existing Rel-16 field failureType-v1610 with the correct failure cause. When the failureTypeOther-r16 field is included, the receiving eNB ignores the included failureType-r15 field, which does not contain a valid failure cause. On the other hand, when the failureTypeOther-r16 field is not included, the receiving eNB decodes the valid failure cause indicated by the failureType-r15 field.

In a second option, the interpretation of the existing Rel-16 field failureType-v1610 can be redefined such that when the MeNB receives a SCGFailureInformationNR message that includes the Rel-16 field failureType-v1610, it ignores the content of the Rel-15 field failureType-r15 included in the same message. In other words, when the failureType-v1610 field is included, the receiving eNB ignores the included failureType-r15 field, which does not contain a valid failure cause. On the other hand, when the failureType-v1610 field is not included, the receiving eNB decodes the valid failure cause indicated by the failureType-r15 field.

In a third option, the field failureType-v1610 can be moved outside of the Rel-15 FailureReportSCG-NR IE into a new Rel-16 IE, e.g., FailureReportSCG-NR-r16. FIG. 12 shows an ASN.1 data structure for an exemplary SCGFailureInformationNR message in accordance with these embodiments. In this arrangement, when the UE wants to indicate a Rel-16 failure cause, it can include the FailureReportSCG-NR-r16IE but not the FailureReportSCG-NR IE in the SCGFailureInformationNR message. On the other hand, when the UE wants to indicate a Rel-15 failure cause, it can include the FailureReportSCG-NR IE but not the FailureReportSCG-NR-r16 IE in the SCGFailureInformationNR message.

In other embodiments, when the Rel-15 eNB receives an SCGFailureInformationNR message as shown in FIG. 8 with a failureType-r15 field having a value "other-r16", the Rel-15 eNB should skip the decoding of the failureType-r15 field and continue decoding the remaining of the SCGFailureInformationNR message. In other words, the Rel-15 eNB will not trigger an ASN.1 syntax error based on the failureType-r15 field having a value "other-r16" and will correctly decode the remainder of the SCGFailureInformationNR message. The following proposed text illustrates an example implementation of such embodiments, with underline showing additions relative to 3GPP TS 36.331 (v15.13.0).

*Begin Proposed Text for 3GPP TS 36.331*

5.6.13a.3 Actions Related to Transmission of SCGFailureInformationNR Message

The UE shall set the contents of the SCGFailureInformationNR message as follows:

1> include failureType within failureReportSCG-NR and set it to indicate the SCG failure in accordance with TS 38.331 [82], clause 5.7.3.3;

NOTE: If the field failureType is set to a value that is different from those one in accordance with TS 38.331 [82], clause 5.7.3.3, the network shall not consider this as an ASN.1 syntax error and shall continue to correctly decode the SCGFailureInformationNR message.

1> include and set measResultSCG in accordance with TS 38.331 [82], clause 5.7.3.4:

1> for each NR frequency the UE is configured to measure by measConfig for which measurement results are available:

2> set the measResultFreqListNR to include the best measured cells, ordered such that the best cell is listed first using RSRP to order if RSRP measurement results are available for cells on this frequency, otherwise using RSRQ to order if RSRQ measurement results are available for cells on this frequency, otherwise using SINR to order, and based on measurements collected up to the moment the UE detected the failure, and for each cell that is included, include the optional fields that are available;

NOTE: Field measResultSCG is used to report available results for NR frequencies the UE is configured to measure by NR RRC signalling.

The UE shall submit the SCGFailureInformationNR message to lower layers for transmission.

*End Proposed Text for 3GPP TS 36.331*

The embodiments described above can be further illustrated with reference to FIGS. 13-14, which show exemplary methods (e.g., procedures) performed by a UE and a network node, respectively. In other words, various features of operations described below correspond to various embodiments described above. These exemplary methods can be used cooperatively to provide various exemplary benefits and/or advantages. Although FIGS. 13-14 show specific blocks in a particular order, the operations of the respective methods can be performed in different orders than shown and can be combined and/or divided into blocks having different functionality than shown. Optional blocks or operations are indicated by dashed lines.

In particular, FIG. 13 shows a flow diagram of an exemplary method (e.g., procedure) for a UE configured to communicate with a wireless network via an MCG and an SCG, according to various embodiments of the present disclosure. The exemplary method can be performed by a UE (e.g., wireless device, IoT device, modem, etc. or component thereof) such as described elsewhere herein.

The exemplary method can include operations of block 1310, where the UE can detect a failure in the SCG and select a failure cause. The failure cause can be selected from the following: a first set of causes associated with an earlier version of communication functionality, and a second set of causes associated with a later version of communication functionality. The exemplary method can also include operations of block 1320, where the UE can send a failure information message to a network node that provides the MCG. The failure information message indicates whether the failure cause is one of the first set or one of the second set. In some embodiments, the exemplary method can also include operations of block 1330, where the UE can perform an SCG recovery procedure with the network node based on the selected failure cause.

In some embodiments, the earlier version of communication functionality corresponds to Rel-15 of 3GPP specifications, and the later version of communication functionality corresponds to Rel-16 of 3GPP specifications. In some embodiments, the network node providing the MCG is an eNB and the message is an SCGFailureInformation-NR message.

In some embodiments, the failure information message indicates whether the failure cause is one of the first set or one of the second set based on including one or more of the following: a first indication of one of the first set of causes, a second indication of one of the second set of causes, and a third indication that the failure cause is indicated by the second indication.

In some of these embodiments, the first indication is a failureType-r15 field of the failure information message, the second indication is a failureType-r16 field of the failure information message, and the third indication is a failureTypeOther-r16 field of the failure information message.

In some of these embodiments, the first set of causes associated with the earlier version of communication functionality include at least two of the following: expiry of a timer T310, random access problem in the SCG, reaching a maximum number of retransmissions in UE's RLC for the SCG, reconfiguration with sync failure for the SCG, and reconfiguration failure of RRC message. The failureType-r15 field shown in FIG. 11 is an example of these embodiments.

In some of these embodiments, the second set of causes associated with the later version of communication functionality include at least two of the following: expiry of a timer T312, consistent UE uplink listen-before-talk (LBT) failure in the SCG, a failed BFR procedure in the SCG, a backhaul RLF in the SCG. The failureType-v1610 field shown in FIG. 11 is an example of these embodiments.

In some of these embodiments, the failure information message includes the first indication and the second indication and the failure information message indicates whether the failure cause is one of the first set or one of the second set based on the following:

including the third indication, which indicates that the failure cause is indicated by the second indication of one of the second set of causes; and excluding the third indication, which indicates that the failure cause is indicated by the first indication of one of the first set of causes.

In other of these embodiments, the failure information message includes the first indication and the failure information message indicates whether the failure cause is one of the first set or one of the second set based on the following:

including the second indication, which indicates that the failure cause is indicated by the second indication of one of the second set of causes; and excluding the second indication, which indicates that the failure cause is indicated by the first indication of one of the first set of causes.

In other of these embodiments, the failure information message includes the first indication and the first set of causes also includes a further cause associated with the later version of communication functionality. An example further cause is the "other-r16" value of the failureType-r15 field discussed above, with the other values of this field being examples of causes associated with the earlier version of communication functionality. In such embodiments, when the first indication indicates the further cause, the failure information message also includes the second indication. Furthermore, the failure information message indicates that the failure cause is one of the second set when the first indication indicates the further cause, and that the failure cause is one of the first set when the first indication indicates one of the causes associated with the earlier version of communication functionality.

In other embodiments, the failure information message includes either the first indication or the second indication and the failure information message indicates whether the failure cause is one of the first set or one of the second set based on the following:

including the first indication, which indicates that the failure cause is indicated by the first indication of one of the first set of causes; and including the second indication, which indicates that the failure cause is indicated by the second indication of one of the second set of causes.

The ASN.1 data structure shown in FIG. 12 is an example of such embodiments.

In addition, FIG. 14 shows a flow diagram of an exemplary method (e.g., procedure) for a network node configured to provide an MCG in a wireless network for a UE that is also configured to communicate with the wireless network via an SCG, according to various embodiments of the present disclosure. The exemplary method can be performed by a network node (e.g., base station, eNB, gNB, ng-eNB, en-gNB, etc., or components thereof) such as described elsewhere herein.

The exemplary method can include the operations of block 1410, where the network node can receive, from the UE, a failure information message indicating a failure detected by the UE in the SCG. The failure information message indicates whether the failure cause is one of a first set of causes associated with an earlier version of communication functionality, or one of a second set of causes associated with a later version of communication functionality. The exemplary method can also include the operations of block 1420, where the network node can determine the failure cause based on the failure information message and at least one of the first set and the second set. In some embodiments, the exemplary method can also include the operations of block 1430, where the network node can perform an SCG recovery procedure with the UE based on the determined failure cause.

In some embodiments, the earlier version of communication functionality corresponds to Rel-15 of 3GPP specifications, and the later version of communication functionality corresponds to Rel-16 of 3GPP specifications. In some embodiments, the network node that provides the MCG is an eNB and the message is an SCGFailureInformation-NR message.

In some embodiments, the failure information message indicates whether the failure cause is one of the first set or one of the second set based on including one or more of the following: a first indication of one of the first set of causes, a second indication of one of the second set of causes, and a third indication that the failure cause is indicated by the second indication.

In some of these embodiments, the first indication is a failureType-r15 field of the failure information message, the second indication is a failureType-r16 field of the failure information message, and the third indication is a failureTypeOther-r16 field of the failure information message.

In some of these embodiments, the first set of causes associated with the earlier version of communication functionality include at least two of the following: expiry of a timer T310, random access problem in the SCG, reaching a maximum number of retransmissions in UE's radio link control (RLC) for the SCG, reconfiguration with sync failure for the SCG, and reconfiguration failure of RRC message. The failureType-r15 field shown in FIG. 11 is an example of these embodiments.

In some of these embodiments, the second set of causes associated with the later version of communication functionality include at least two of the following: expiry of a timer T312, consistent UE uplink LBT failure in the SCG, a failed BFR procedure in the SCG, a backhaul RLF in the SCG. The failureType-v1610 field shown in FIG. 11 is an example of these embodiments.

In some of these embodiments, the failure information message includes the first indication and the second indication. In such embodiments, determining the failure cause in block 1420 can include the operations of sub-blocks 1421-1422, where the UE can determine the failure cause based on the second indication and the second set of causes, when the failure information message also includes the third indication; and determine the failure cause based on the first indication and the first set of causes, when the failure information message does not include the third indication.

In other of these embodiments, the failure information message includes the first indication. In such embodiments, determining the failure cause in block 1420 can include the operations of sub-blocks 1423-1424, where the UE can determine the failure cause based on the second indication and the second set of causes, when the failure information message also includes the second indication; and determine the failure cause based on the first indication and the first set of causes, when the failure information message does not include the second indication.

In other of these embodiments, the failure information message includes the first indication and the first set of causes also includes a further cause associated with the later version of communication functionality. When the first indication indicates the further cause, the failure information message also includes the second indication. An example further cause is the "other-r16" value of the failureType-r15 field discussed above, with the other values of this field being examples of causes associated with the earlier version of communication functionality.

In such embodiments, determining the failure cause in block 1420 can include the operations of sub-blocks 1425-1426, where the UE can determine the failure cause based on the first indication and the first set of causes, when the first indication indicates one of the causes associated with the earlier version of communication functionality; and determine the failure cause based on the second indication and the second set of causes, when the first indication indicates the further cause associated with the later version of communication functionality.

In other embodiments, the failure information message includes either the first indication or the second indication. The ASN.1 data structure shown in FIG. 12 is an example of these embodiments. In such embodiments, determining the failure cause in block 1420 can include the operations of sub-blocks 1427-1428, where the UE can determine the failure cause based on the first indication and the first set of causes, when the failure information message includes the first indication; and determine the failure cause based on the second indication and the second set of causes, when the failure information message includes the second indication.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 15:
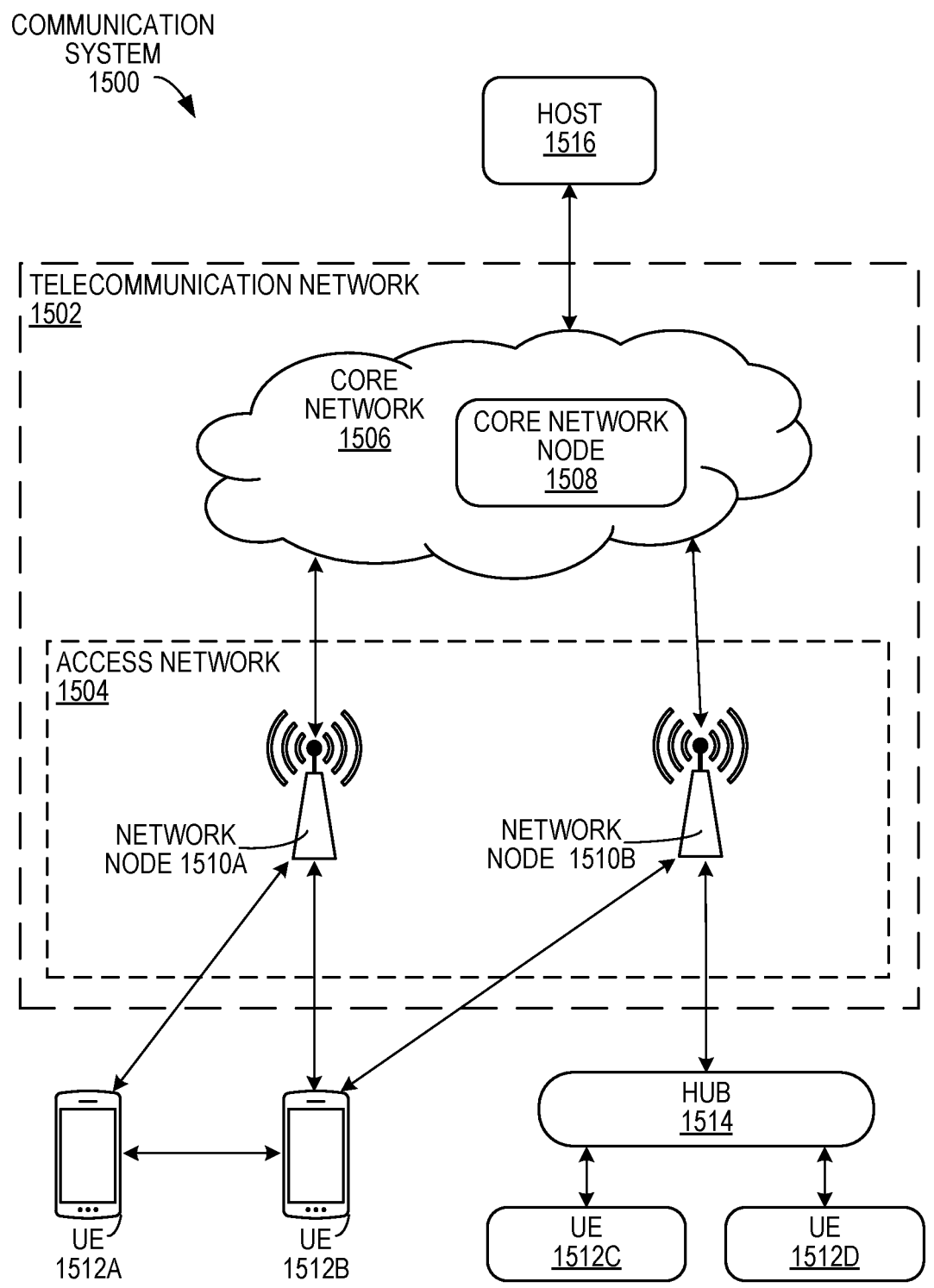
FIG. 15 shows a communication system according to various embodiments of the present disclosure.

FIG. 15 shows an example of a communication system 1500 in accordance with some embodiments. In this example, the communication system 1500 includes a telecommunication network 1502 that includes an access network 1504, such as a radio access network (RAN), and a core network 1506, which includes one or more core network nodes 1508. The access network 1504 includes one or more access network nodes, such as network nodes 1510*a* and 1510*b* (one or more of which may be generally referred to as network nodes 1510), or any other 3GPP access node or non-3GPP access point. The network nodes 1510 facilitate direct or indirect connection of UEs, such as by connecting UEs 1512*a*, 1512*b*, 1512*c*, and 1512*d* (one or more of which may be generally referred to as UEs 1512) to the core network 1506 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1500 may include any number of wired or wireless networks, network nodes, UEs, and/or any other components or systems that may facilitate or participate in the communication of data and/or signals whether via wired or wireless connections. The communication system 1500 may include and/or interface with any type of communication, telecommunication, data, cellular, radio network, and/or other similar type of system.

The UEs 1512 may be any of a wide variety of communication devices, including wireless devices arranged, configured, and/or operable to communicate wirelessly with the network nodes 1510 and other communication devices. Similarly, the network nodes 1510 are arranged, capable, configured, and/or operable to communicate directly or indirectly with the UEs 1512 and/or with other network nodes or equipment in the telecommunication network 1502 to enable and/or provide network access, such as wireless network access, and/or to perform other functions, such as administration in the telecommunication network 1502.

In the depicted example, the core network 1506 connects the network nodes 1510 to one or more hosts, such as host 1516. These connections may be direct or indirect via one or more intermediary networks or devices. In other examples, network nodes may be directly coupled to hosts. The core network 1506 includes one more core network nodes (e.g., core network node 1508) that are structured with hardware and software components. Features of these components may be substantially similar to those described with respect to the UEs, network nodes, and/or hosts, such that the descriptions thereof are generally applicable to the corresponding components of the core network node 1508. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1516 may be under the ownership or control of a service provider other than an operator or provider of the access network 1504 and/or the telecommunication network 1502 and may be operated by the service provider or on behalf of the service provider. The host 1516 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1500 of FIG. 15 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1502 is a cellular network that implements 3GPP standardized features. Accordingly, the telecommunications network 1502 may support network slicing to provide different logical networks to different devices that are connected to the telecommunication network 1502. For example, the telecommunications network 1502 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1512 are configured to transmit and/or receive information without direct human interaction. For instance, a UE may be designed to transmit information to the access network 1504 on a predetermined schedule, when triggered by an internal or external event, or in response to requests from the access network 1504. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1514 communicates with the access network 1504 to facilitate indirect communication between one or more UEs (e.g., UE 1512*c* and/or 1512*d*) and network nodes (e.g., network node 1510*b*). In some examples, the hub 1514 may be a controller, router, content source and analytics, or any of the other communication devices described herein regarding UEs. For example, the hub 1514 may be a broadband router enabling access to the core network 1506 for the UEs. As another example, the hub 1514 may be a controller that sends commands or instructions to one or more actuators in the UEs. Commands or instructions may be received from the UEs, network nodes 1510, or by executable code, script, process, or other instructions in the hub 1514. As another example, the hub 1514 may be a data collector that acts as temporary storage for UE data and, in some embodiments, may perform analysis or other processing of the data. As another example, the hub 1514 may be a content source. For example, for a UE that is a VR headset, display, loudspeaker or other media delivery device, the hub 1514 may retrieve VR assets, video, audio, or other media or data related to sensory information via a network node, which the hub 1514 then provides to the UE either directly, after performing local processing, and/or after adding additional local content. In still another example, the hub 1514 acts as a proxy server or orchestrator for the UEs, in particular in if one or more of the UEs are low energy IoT devices.

The hub 1514 may have a constant/persistent or intermittent connection to the network node 1510*b*. The hub 1514 may also allow for a different communication scheme and/or schedule between the hub 1514 and UEs (e.g., UE 1512*c* and/or 1512*d*), and between the hub 1514 and the core network 1506. In other examples, the hub 1514 is connected to the core network 1506 and/or one or more UEs via a wired connection. Moreover, the hub 1514 may be configured to connect to an M2M service provider over the access network 1504 and/or to another UE over a direct connection. In some scenarios, UEs may establish a wireless connection with the network nodes 1510 while still connected via the hub 1514 via a wired or wireless connection. In some embodiments, the hub 1514 may be a dedicated hub—that is, a hub whose primary function is to route communications to/from the UEs from/to the network node 1510*b*. In other embodiments, the hub 1514 may be a non-dedicated hub—that is, a device which is capable of operating to route communications between the UEs and network node 1510*b*, but which is additionally capable of operating as a communication start and/or end point for certain data channels.

Figure 16:
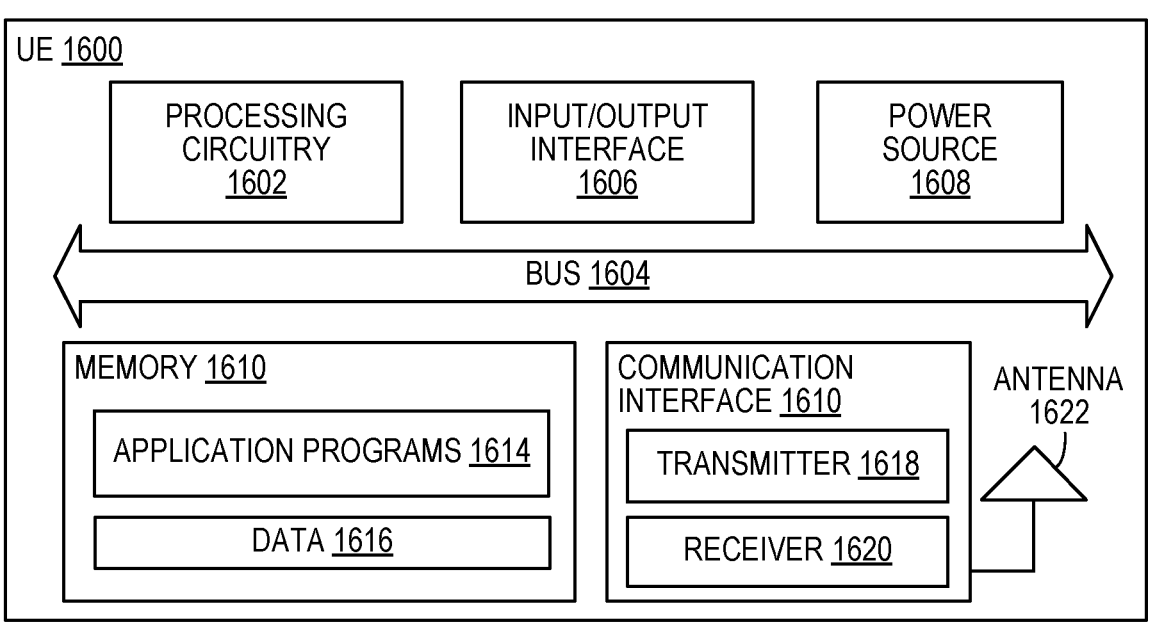
FIG. 16 shows a UE according to various embodiments of the present disclosure.

FIG. 16 shows a UE 1600 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1600 includes processing circuitry 1602 that is operatively coupled via a bus 1604 to an input/output interface 1606, a power source 1608, a memory 1610, a communication interface 1612, and/or any other component, or any combination thereof. Certain UEs may utilize all or a subset of the components shown in FIG. 16. The level of integration between the components may vary from one UE to another UE. Further, certain UEs may contain multiple instances of a component, such as multiple processors, memories, transceivers, transmitters, receivers, etc.

The processing circuitry 1602 is configured to process instructions and data and may be configured to implement any sequential state machine operative to execute instructions stored as machine-readable computer programs in the memory 1610. The processing circuitry 1602 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1602 may include multiple central processing units (CPUs).

In the example, the input/output interface 1606 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1600. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1608 is structured as a battery or battery pack. Other types of power sources, such as an external power source (e.g., an electricity outlet), photovoltaic device, or power cell, may be used. The power source 1608 may further include power circuitry for delivering power from the power source 1608 itself, and/or an external power source, to the various parts of the UE 1600 via input circuitry or an interface such as an electrical power cable. Delivering power may be, for example, for charging of the power source 1608. Power circuitry may perform any formatting, converting, or other modification to the power from the power source 1608 to make the power suitable for the respective components of the UE 1600 to which power is supplied.

The memory 1610 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1610 includes one or more application programs 1614, such as an operating system, web browser application, a widget, gadget engine, or other application, and corresponding data 1616. The memory 1610 may store, for use by the UE 1600, any of a variety of various operating systems or combinations of operating systems.

The memory 1610 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (STMs), such as a USIM and/or ISIM, other memory, or any combination thereof. The UICC may for example be an embedded UICC (eUICC), integrated UICC (iUICC) or a removable UICC commonly known as 'SIM card.' The memory 1610 may allow the UE 1600 to access instructions, application programs and the like, stored on transitory or non-transitory memory media, to off-load data, or to upload data. An article of manufacture, such as one utilizing a communication system may be tangibly embodied as or in the memory 1610, which may be or comprise a device-readable storage medium.

The processing circuitry 1602 may be configured to communicate with an access network or other network using the communication interface 1612. The communication interface 1612 may comprise one or more communication subsystems and may include or be communicatively coupled to an antenna 1622. The communication interface 1612 may include one or more transceivers used to communicate, such as by communicating with one or more remote transceivers of another device capable of wireless communication (e.g., another UE or a network node in an access network). Each transceiver may include a transmitter 1618 and/or a receiver 1620 appropriate to provide network communications (e.g., optical, electrical, frequency allocations, and so forth). Moreover, the transmitter 1618 and receiver 1620 may be coupled to one or more antennas (e.g., antenna 1622) and may share circuit components, software or firmware, or alternatively be implemented separately.

In the illustrated embodiment, communication functions of the communication interface 1612 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1612, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., an alert is sent when moisture is detected), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1600 shown in FIG. 16.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 17:
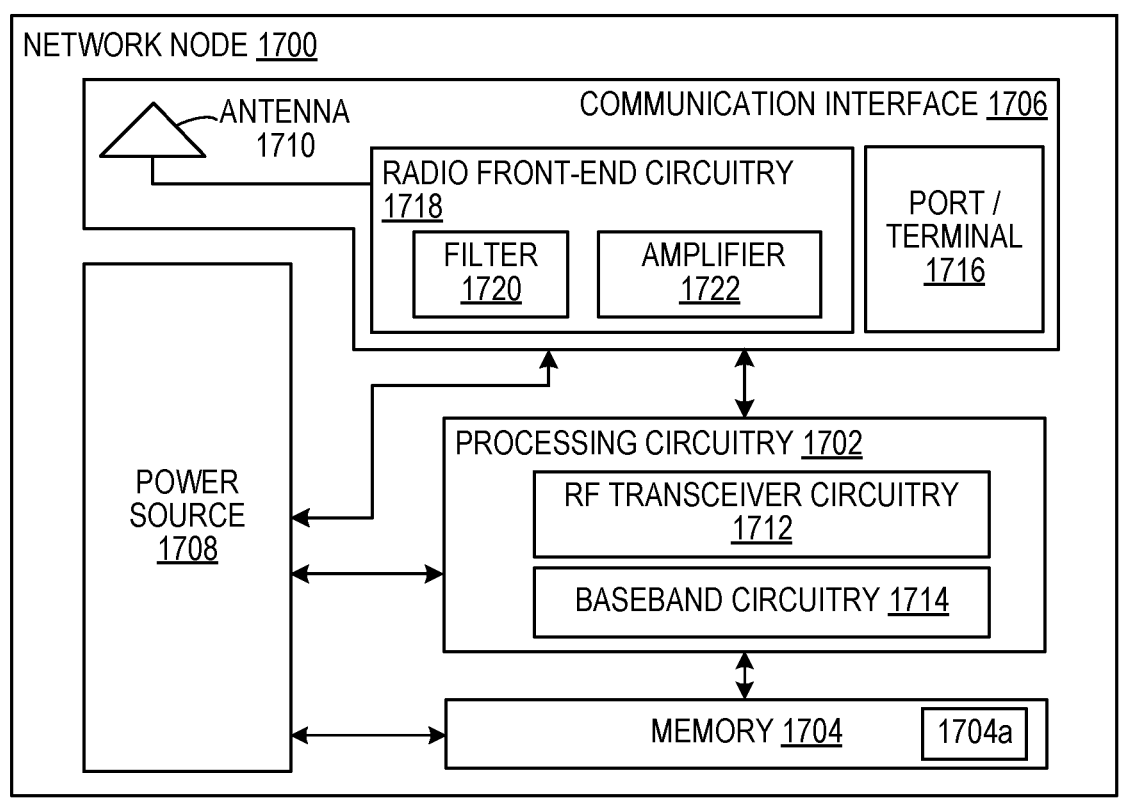
FIG. 17 shows a network node according to various embodiments of the present disclosure.

FIG. 17 shows a network node 1700 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1700 includes a processing circuitry 1702, a memory 1704, a communication interface 1706, and a power source 1708. The network node 1700 may be composed of multiple physically separate components (e.g., a NodeB component and a RNC component, or a BTS component and a BSC component, etc.), which may each have their own respective components. In certain scenarios in which the network node 1700 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1700 may be configured to support multiple radio access technologies (RATs). In such embodiments, some components may be duplicated (e.g., separate memory 1704 for different RATs) and some components may be reused (e.g., a same antenna 1710 may be shared by different RATs). The network node 1700 may also include multiple sets of the various illustrated components for different wireless technologies integrated into network node 1700, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1700.

The processing circuitry 1702 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1700 components, such as the memory 1704, to provide network node 1700 functionality.

In some embodiments, the processing circuitry 1702 includes a system on a chip (SOC). In some embodiments, the processing circuitry 1702 includes one or more of radio frequency (RF) transceiver circuitry 1712 and baseband processing circuitry 1714. In some embodiments, the radio frequency (RF) transceiver circuitry 1712 and the baseband processing circuitry 1714 may be on separate chips (or sets of chips), boards, or units, such as radio units and digital units. In alternative embodiments, part or all of RF transceiver circuitry 1712 and baseband processing circuitry 1714 may be on the same chip or set of chips, boards, or units.

The memory 1704 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1702. The memory 1704 may store any suitable instructions, data, or information, including a computer program, software, an application including one or more of logic, rules, code, tables, and/or other instructions (collectively denoted computer program product 1704a) capable of being executed by the processing circuitry 1702 and utilized by the network node 1700. The memory 1704 may be used to store any calculations made by the processing circuitry 1702 and/or any data received via the communication interface 1706. In some embodiments, the processing circuitry 1702 and memory 1704 is integrated.

The communication interface 1706 is used in wired or wireless communication of signaling and/or data between a network node, access network, and/or UE. As illustrated, the communication interface 1706 comprises port(s)/terminal(s) 1716 to send and receive data, for example to and from a network over a wired connection. The communication interface 1706 also includes radio front-end circuitry 1718 that may be coupled to, or in certain embodiments a part of, the antenna 1710. Radio front-end circuitry 1718 comprises filters 1720 and amplifiers 1722. The radio front-end circuitry 1718 may be connected to an antenna 1710 and processing circuitry 1702. The radio front-end circuitry may be configured to condition signals communicated between antenna 1710 and processing circuitry 1702. The radio front-end circuitry 1718 may receive digital data that is to be sent out to other network nodes or UEs via a wireless connection. The radio front-end circuitry 1718 may convert the digital data into a radio signal having the appropriate channel and bandwidth parameters using a combination of filters 1720 and/or amplifiers 1722. The radio signal may then be transmitted via the antenna 1710. Similarly, when receiving data, the antenna 1710 may collect radio signals which are then converted into digital data by the radio front-end circuitry 1718. The digital data may be passed to the processing circuitry 1702. In other embodiments, the communication interface may comprise different components and/or different combinations of components.

In certain alternative embodiments, the network node 1700 does not include separate radio front-end circuitry 1718, instead, the processing circuitry 1702 includes radio front-end circuitry and is connected to the antenna 1710. Similarly, in some embodiments, all or some of the RF transceiver circuitry 1712 is part of the communication interface 1706. In still other embodiments, the communication interface 1706 includes one or more ports or terminals 1716, the radio front-end circuitry 1718, and the RF transceiver circuitry 1712, as part of a radio unit (not shown), and the communication interface 1706 communicates with the baseband processing circuitry 1714, which is part of a digital unit (not shown).

The antenna 1710 may include one or more antennas, or antenna arrays, configured to send and/or receive wireless signals. The antenna 1710 may be coupled to the radio front-end circuitry 1718 and may be any type of antenna capable of transmitting and receiving data and/or signals wirelessly. In certain embodiments, the antenna 1710 is separate from the network node 1700 and connectable to the network node 1700 through an interface or port.

The antenna 1710, communication interface 1706, and/or the processing circuitry 1702 may be configured to perform any receiving operations and/or certain obtaining operations described herein as being performed by the network node. Any information, data and/or signals may be received from a UE, another network node and/or any other network equipment. Similarly, the antenna 1710, the communication interface 1706, and/or the processing circuitry 1702 may be configured to perform any transmitting operations described herein as being performed by the network node. Any information, data and/or signals may be transmitted to a UE, another network node and/or any other network equipment.

The power source 1708 provides power to the various components of network node 1700 in a form suitable for the respective components (e.g., at a voltage and current level needed for each respective component). The power source 1708 may further comprise, or be coupled to, power management circuitry to supply the components of the network node 1700 with power for performing the functionality described herein. For example, the network node 1700 may be connectable to an external power source (e.g., the power grid, an electricity outlet) via an input circuitry or interface such as an electrical cable, whereby the external power source supplies power to power circuitry of the power source 1708. As a further example, the power source 1708 may comprise a source of power in the form of a battery or battery pack which is connected to, or integrated in, power circuitry. The battery may provide backup power should the external power source fail.

Embodiments of the network node 1700 may include additional components beyond those shown in FIG. 17 for providing certain aspects of the network node's functionality, including any of the functionality described herein and/or any functionality necessary to support the subject matter described herein. For example, the network node 1700 may include user interface equipment to allow input of information into the network node 1700 and to allow output of information from the network node 1700. This may allow a user to perform diagnostic, maintenance, repair, and other administrative functions for the network node 1700.

Figure 18:
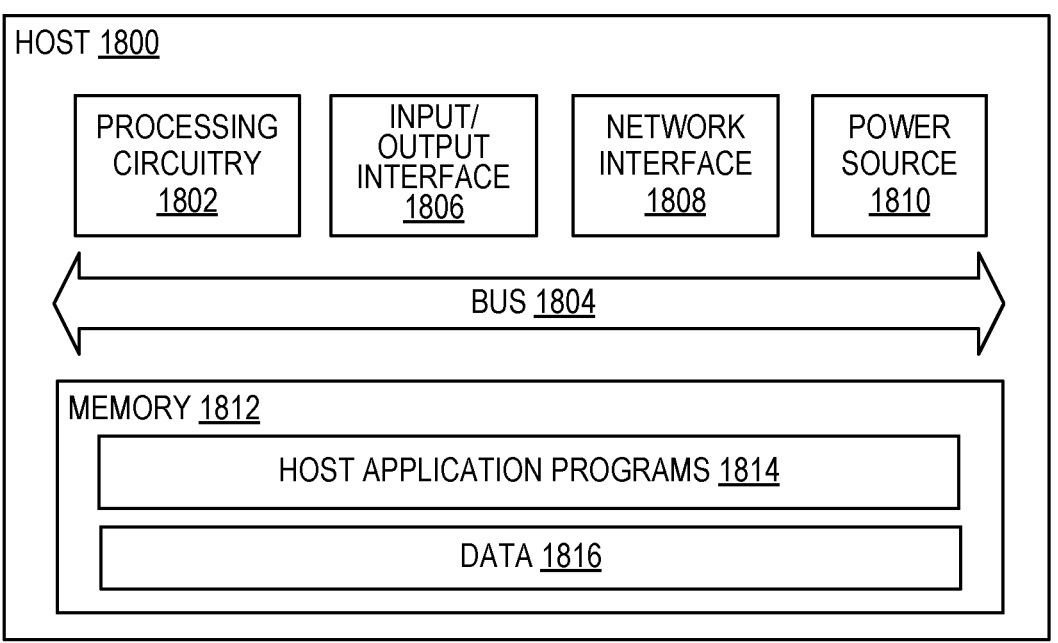
FIG. 18 shows host computing system according to various embodiments of the present disclosure.

FIG. 18 is a block diagram of a host 1800, which may be an embodiment of the host 1516 of FIG. 15, in accordance with various aspects described herein. As used herein, the host 1800 may be or comprise various combinations hardware and/or software, including a standalone server, a blade server, a cloud-implemented server, a distributed server, a virtual machine, container, or processing resources in a server farm. The host 1800 may provide one or more services to one or more UEs.

The host 1800 includes processing circuitry 1802 that is operatively coupled via a bus 1804 to an input/output interface 1806, a network interface 1808, a power source 1810, and a memory 1812. Other components may be included in other embodiments. Features of these components may be substantially similar to those described with respect to the devices of previous figures, such as FIGS. 16 and 17, such that the descriptions thereof are generally applicable to the corresponding components of host 1800.

The memory 1812 may include one or more computer programs including one or more host application programs 1814 and data 1816, which may include user data, e.g., data generated by a UE for the host 1800 or data generated by the host 1800 for a UE. Embodiments of the host 1800 may utilize only a subset or all of the components shown. The host application programs 1814 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1814 may also provide for user authentication and licensing checks and may periodically report health, routes, and content availability to a central node, such as a device in or on the edge of a core network. Accordingly, the host 1800 may select and/or indicate a different host for over-the-top services for a UE. The host application programs 1814 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 19:
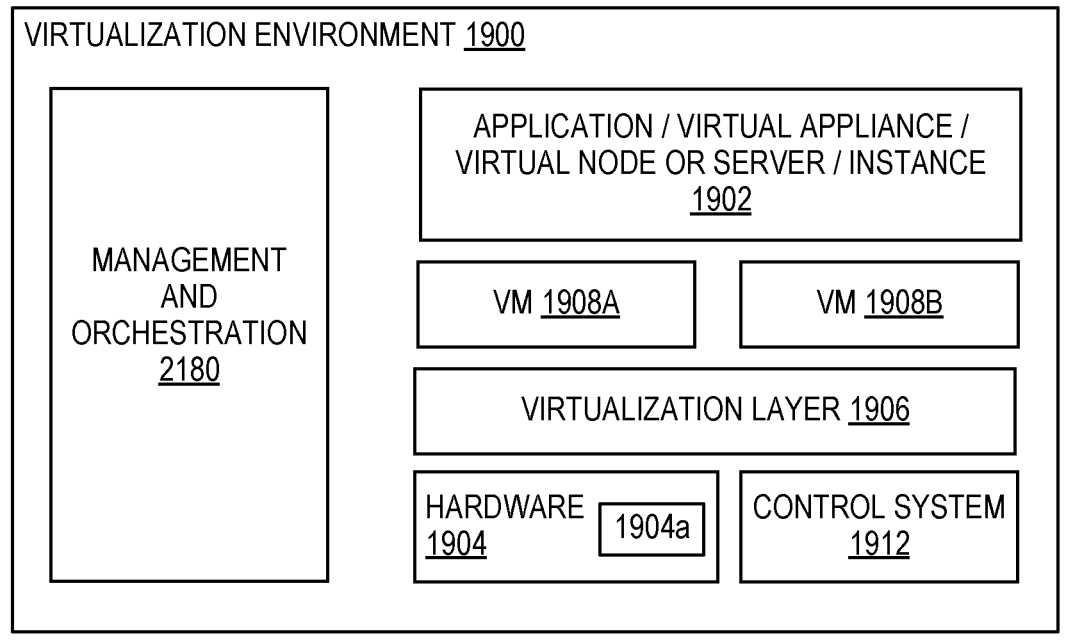
FIG. 19 is a block diagram of a virtualization environment in which functions implemented by some embodiments of the present disclosure may be virtualized.

FIG. 19 is a block diagram illustrating a virtualization environment 1900 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1900 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1902 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1904 includes processing circuitry, memory that stores software and/or instructions (collectively denoted computer program product 1904a) executable by hardware processing circuitry, and/or other hardware devices as described herein, such as a network interface, input/output interface, and so forth. Software may be executed by the processing circuitry to instantiate one or more virtualization layers 1906 (also referred to as hypervisors or virtual machine monitors (VMMs)), provide VMs 1908a and 1908b (one or more of which may be generally referred to as VMs 1908), and/or perform any of the functions, features and/or benefits described in relation with some embodiments described herein. The virtualization layer 1906 may present a virtual operating platform that appears like networking hardware to the VMs 1908.

The VMs 1908 comprise virtual processing, virtual memory, virtual networking or interface and virtual storage, and may be run by a corresponding virtualization layer 1906. Different embodiments of the instance of a virtual appliance 1902 may be implemented on one or more of VMs 1908, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1908 may be a software implementation of a physical machine that runs programs as if they were executing on a physical, non-virtualized machine. Each of the VMs 1908, and that part of hardware 1904 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1908 on top of the hardware 1904 and corresponds to the application 1902.

Hardware 1904 may be implemented in a standalone network node with generic or specific components. Hardware 1904 may implement some functions via virtualization. Alternatively, hardware 1904 may be part of a larger cluster of hardware (e.g., such as in a data center or CPE) where many hardware nodes work together and are managed via management and orchestration 1910, which, among others, oversees lifecycle management of applications 1902. In some embodiments, hardware 1904 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1912 which may alternatively be used for communication between hardware nodes and radio units.

Figure 20:
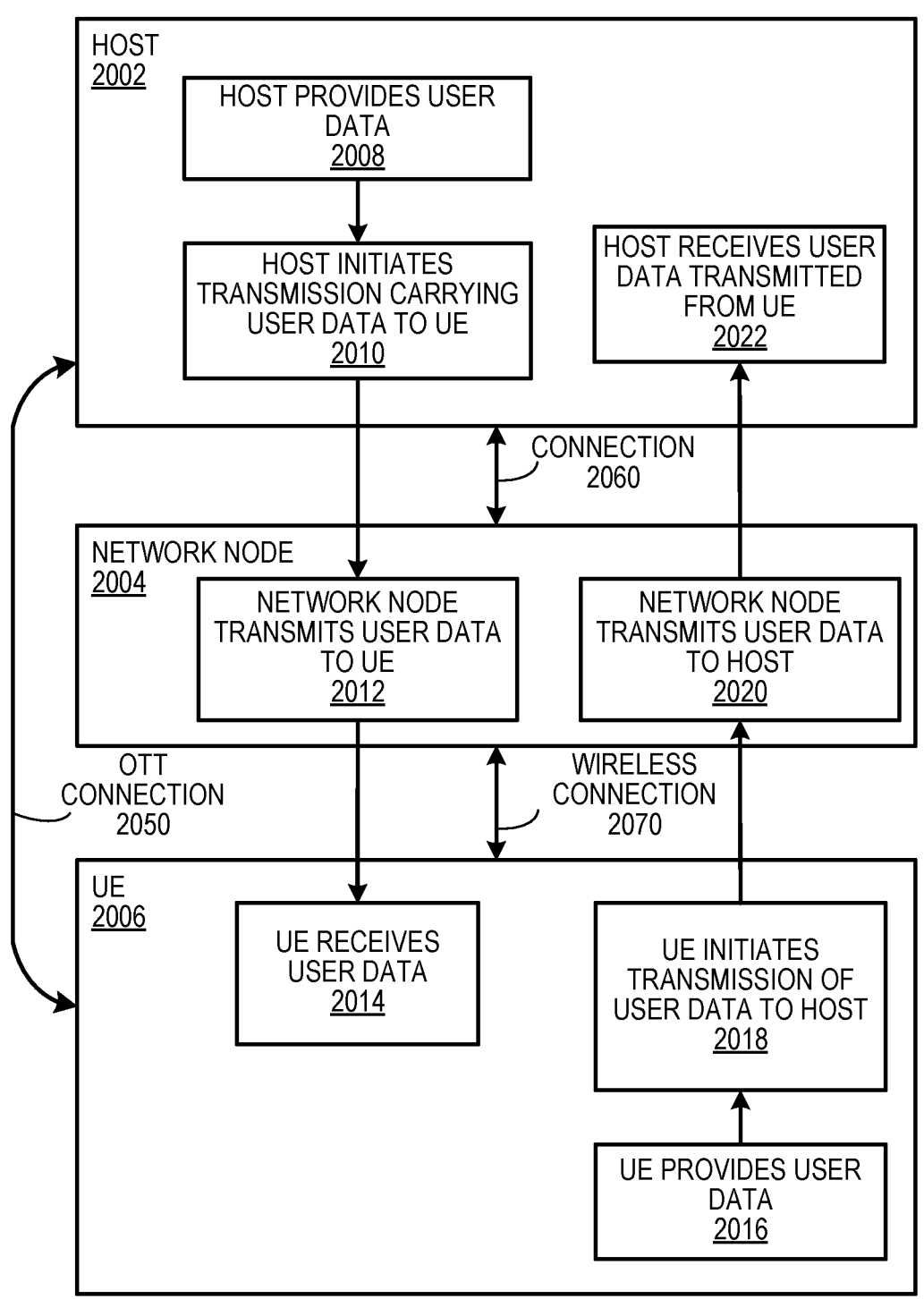
FIG. 20 illustrates communication between a host computing system, a network node, and a UE via multiple connections, at least one of which is wireless, according to various embodiments of the present disclosure.

FIG. 20 shows a communication diagram of a host 2002 communicating via a network node 2004 with a UE 2006 over a partially wireless connection in accordance with some embodiments. Example implementations, in accordance with various embodiments, of the UE (such as a UE 1512a of FIG. 15 and/or UE 1600 of FIG. 16), network node (such as network node 1510a of FIG. 15 and/or network node 1700 of FIG. 17), and host (such as host 1516 of FIG. 15 and/or host 1800 of FIG. 18) discussed in the preceding paragraphs will now be described with reference to FIG. 20.

Like host 1800, embodiments of host 2002 include hardware, such as a communication interface, processing circuitry, and memory. The host 2002 also includes software, which is stored in or accessible by the host 2002 and executable by the processing circuitry. The software includes a host application that may be operable to provide a service to a remote user, such as the UE 2006 connecting via an over-the-top (OTT) connection 2050 extending between the UE 2006 and host 2002. In providing the service to the remote user, a host application may provide user data which is transmitted using the OTT connection 2050.

The network node 2004 includes hardware enabling it to communicate with the host 2002 and UE 2006. The connection 2060 may be direct or pass through a core network (like core network 1506 of FIG. 15) and/or one or more other intermediate networks, such as one or more public, private, or hosted networks. For example, an intermediate network may be a backbone network or the Internet.

The UE 2006 includes hardware and software, which is stored in or accessible by UE 2006 and executable by the UE's processing circuitry. The software includes a client application, such as a web browser or operator-specific "app" that may be operable to provide a service to a human or non-human user via UE 2006 with the support of the host 2002. In the host 2002, an executing host application may communicate with the executing client application via the OTT connection 2050 terminating at the UE 2006 and host 2002. In providing the service to the user, the UE's client application may receive request data from the host's host application and provide user data in response to the request data. The OTT connection 2050 may transfer both the request data and the user data. The UE's client application may interact with the user to generate the user data that it provides to the host application through the OTT connection 2050.

The OTT connection 2050 may extend via a connection 2060 between the host 2002 and the network node 2004 and via a wireless connection 2070 between the network node 2004 and the UE 2006 to provide the connection between the host 2002 and the UE 2006. The connection 2060 and wireless connection 2070, over which the OTT connection 2050 may be provided, have been drawn abstractly to illustrate the communication between the host 2002 and the UE 2006 via the network node 2004, without explicit reference to any intermediary devices and the precise routing of messages via these devices.

As an example of transmitting data via the OTT connection 2050, in step 2008, the host 2002 provides user data, which may be performed by executing a host application. In some embodiments, the user data is associated with a particular human user interacting with the UE 2006. In other embodiments, the user data is associated with a UE 2006 that shares data with the host 2002 without explicit human interaction. In step 2010, the host 2002 initiates a transmission carrying the user data towards the UE 2006. The host 2002 may initiate the transmission responsive to a request transmitted by the UE 2006. The request may be caused by human interaction with the UE 2006 or by operation of the client application executing on the UE 2006. The transmission may pass via the network node 2004, in accordance with the teachings of the embodiments described throughout this disclosure. Accordingly, in step 2012, the network node 2004 transmits to the UE 2006 the user data that was carried in the transmission that the host 2002 initiated, in accordance with the teachings of the embodiments described throughout this disclosure. In step 2014, the UE 2006 receives the user data carried in the transmission, which may be performed by a client application executed on the UE 2006 associated with the host application executed by the host 2002.

In some examples, the UE 2006 executes a client application which provides user data to the host 2002. The user data may be provided in reaction or response to the data received from the host 2002. Accordingly, in step 2016, the UE 2006 may provide user data, which may be performed by executing the client application. In providing the user data, the client application may further consider user input received from the user via an input/output interface of the UE 2006. Regardless of the specific manner in which the user data was provided, the UE 2006 initiates, in step 2018, transmission of the user data towards the host 2002 via the network node 2004. In step 2020, in accordance with the teachings of the embodiments described throughout this disclosure, the network node 2004 receives user data from the UE 2006 and initiates transmission of the received user data towards the host 2002. In step 2022, the host 2002 receives the user data carried in the transmission initiated by the UE 2006.

One or more of the various embodiments improve the performance of OTT services provided to the UE 2006 using the OTT connection 2050, in which the wireless connection 2070 forms the last segment. More precisely, embodiments of the present disclosure can avoid network nodes triggering ASN.1 syntax errors upon receiving the Rel-16 version of certain message fields that are not backward compatible with corresponding Rel-15 versions. This provides the benefit of correct operation of the SCG recovery procedure such that the UE experiencing the SCG failure avoids RRC reestablishment that would result in unwanted delays and connectivity interruptions. This improves the consistency and throughput of OTT services that rely on such connectivity, which increases the value of such services to end users and service providers.

In an example scenario, factory status information may be collected and analyzed by the host 2002. As another example, the host 2002 may process audio and video data which may have been retrieved from a UE for use in creating maps. As another example, the host 2002 may collect and analyze real-time data to assist in controlling vehicle congestion (e.g., controlling traffic lights). As another example, the host 2002 may store surveillance video uploaded by a UE. As another example, the host 2002 may store or control access to media content such as video, audio, VR or AR which it can broadcast, multicast or unicast to UEs. As other examples, the host 2002 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 2050 between the host 2002 and UE 2006, in response to variations in the measurement results. The measurement procedure and/or the network functionality for reconfiguring the OTT connection may be implemented in software and hardware of the host 2002 and/or UE 2006. In some embodiments, sensors (not shown) may be deployed in or in association with other devices through which the OTT connection 2050 passes; the sensors may participate in the measurement procedure by supplying values of the monitored quantities exemplified above, or supplying values of other physical quantities from which software may compute or estimate the monitored quantities. The reconfiguring of the OTT connection 2050 may include message format, retransmission settings, preferred routing etc.; the reconfiguring need not directly alter the operation of the network node 2004. Such procedures and functionalities may be known and practiced in the art. In certain embodiments, measurements may involve proprietary UE signaling that facilitates measurements of throughput, propagation times, latency and the like, by the host 2002. The measurements may be implemented in that software causes messages to be transmitted, in particular empty or 'dummy' messages, using the OTT connection 2050 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The techniques and apparatus described herein include, but are not limited to, the following enumerated examples:

A1. A method for a user equipment (UE) configured to communicate with a wireless network via a master cell group (MCG) and a secondary cell group (SCG), the method comprising:

detecting a failure in the SCG and selecting a failure cause, wherein the failure cause is selected from the following:

a first set of causes associated with an earlier version of functionality, and a second set of causes associated with a later version of functionality;

sending a failure information message to a network node providing the MCG, the failure information message including a third indication of whether the failure cause is one of the first set or one of the second set.

A2. The method of embodiment A1, wherein the failure information includes a first indication of one of the first set of causes.

A3. The method of embodiment A2, wherein:

the failure information message also includes a second indication of one of the second set of causes; and the third indication indicates whether the failure cause is indicated by the first indication or by the second indication.

A4. The method of embodiment A3, wherein:

the third indication, when included in the message, indicates that the failure cause is indicated by the second indication; and exclusion of the third indication from the message indicates that the failure cause is indicated by the first indication.

A5. The method of embodiment A2, wherein the third indication is based on the second indication, such that:

the second indication, when included in the message, indicates that the failure cause is indicated by the second indication; and exclusion of the second indication from the message indicates that the failure cause is indicated by the first indication.

A6. The method of embodiment A1, wherein:

the failure information message includes a first indication of one of the first set of causes, or a second indication of one of the second set of causes; and the third indication is based on the first indication and the second indication, such that:

inclusion of the first indication in the message indicates that the failure cause is indicated by the first indication, and inclusion of the second indication in the message indicates that the failure cause is indicated by the second indication.

A7. The method of embodiment A2, wherein:

the first set of causes also includes a further cause associated with the later version of functionality; and the third indication is based on whether the first indication indicates the further cause or one of the causes associated with the earlier version of functionality.

A8. The method of embodiment A7, wherein:

when the first indication indicates the further cause, the failure information message includes a second indication of one of the second set of causes; and when the first indication indicates one of the causes associated with the earlier version of functionality, the failure information message does not include the second indication.

A9. The method of embodiments A1-A8, wherein:

the earlier version of functionality corresponds to Release 15 (Rel-15) of 3GPP specifications; and the later version of functionality corresponds to Release 16 (Rel-16) of 3GPP specifications.

A10. The method of any of embodiments A1-A10, wherein the network node providing the MCG is an evolved Node B (eNB) and the message is an SCGFailureInformation-NR message.

A11. The method of any of embodiments A1-A9, further comprising performing an SCG recovery procedure with the network node based on the selected failure cause.

B1. A method for a network node, of a wireless network, configured to provide a master cell group (MCG) for a user equipment (UE) that is also configured to communicate with the wireless network via a secondary cell group (SCG), the method comprising:

receiving, from the UE, a failure information message indicating a failure in the SCG, the failure information message including a third indication of whether the failure cause is one of a first set of causes associated with an earlier version of functionality, or one of a second set of causes associated with a later version of functionality; and determining the failure cause based on the third indication, the first set, and the second set.

B2. The method of embodiment B1, wherein the failure information includes a first indication of one of the first set of causes.

B3. The method of embodiment B2, wherein:

the failure information message also includes a second indication of one of the second set of causes; and the third indication indicates whether the failure cause is indicated by the first indication or by the second indication.

B4. The method of embodiment B3, wherein determining the failure cause comprises:

determining the failure cause based on the second indication when the third indication is included in the message; and determining the failure cause based on the first indication when the third indication is not included in the message.

B5. The method of embodiment B2, wherein the third indication is based on the second indication, such that determining the failure cause comprises:

determining the failure cause based on the second indication when the second indication is included in the message; and determining the failure cause based on the first indication when the second indication is not included in the message.

B6. The method of embodiment B1, wherein:

the failure information message includes a first indication of one of the first set of causes, or a second indication of one of the second set of causes; and the third indication is based on the first indication and the second indication, such that determining the failure cause comprises:

determining the failure cause based on the second indication when the second indication is included in the message; and determining the failure cause based on the first indication when the first indication is included in the message.

B7. The method of embodiment B2, wherein:

the first set of causes also includes a further cause associated with the later version of functionality; and the third indication is based on whether the first indication indicates the further cause or one of the causes associated with the earlier version of functionality.

B8. The method of embodiment B7, wherein:

when the first indication indicates the further cause, the failure information message includes a second indication of one of the second set of causes, such that determining the failure cause is based on the second indication; and when the first indication indicates one of the causes associated with the earlier version of functionality, the failure information message does not include the second indication, such that determining the failure cause is based on the first indication.

B9. The method of embodiments B1-B8, wherein:

the earlier version of functionality corresponds to Release 15 (Rel-15) of 3GPP specifications; and the later version of functionality corresponds to Release 16 (Rel-16) of 3GPP specifications.

B10. The method of any of embodiments B1-B9, wherein the network node providing the MCG is an evolved Node B (eNB) and the message is an SCGFailureInformation-NR message.

B11. The method of any of embodiments B1-B10, further comprising performing an SCG recovery procedure with the UE based on the determined failure cause.

C1. A user equipment (UE) configured to communicate with a wireless network via a master cell group (MCG) and a secondary cell group (SCG), the UE comprising:

communication interface circuitry configured to communicate with the wireless network via the SCG and the MCG; and processing circuitry operatively coupled to the radio transceiver circuitry, whereby the processing circuitry and the radio transceiver circuitry are configured to perform operations corresponding to any of the methods of embodiments A1-A11.

C2. A user equipment (UE) configured to communicate with a wireless network via a master cell group (MCG) and a secondary cell group (SCG), the UE being further configured to perform operations corresponding to any of the methods of embodiments A1-A11.

C3. A non-transitory, computer-readable medium storing computer-executable instructions that, when executed by processing circuitry of a user equipment (UE) arranged to communicate with a wireless network via a master cell group (MCG) and a secondary cell group (SCG), configure the UE to perform operations corresponding to any of the methods of embodiments A1-A11.

C4. A computer program product comprising computer-executable instructions that, when executed by processing circuitry of a user equipment (UE) arranged to communicate with a wireless network via a master cell group (MCG) and a secondary cell group (SCG), configure the UE to perform operations corresponding to any of the methods of embodiments A1-A11.

D1. A network node, of a wireless network, configured to provide a master cell group (MCG) for a user equipment (UE) that is also configured to communicate with the wireless network via a secondary cell group (SCG), the network node comprising:

communication interface circuitry configured to communicate with the UE via the MCG; and processing circuitry operatively coupled to the communication interface circuitry, whereby the processing circuitry and the communication interface circuitry are configured to perform operations corresponding to any of the methods of embodiments B1-B11.

D2. A network node, of a wireless network, configured to provide a master cell group (MCG) for a user equipment (UE) that is also configured to communicate with the wireless network via a secondary cell group (SCG), the network node being further configured to perform operations corresponding to any of the methods of embodiments B1-B11.

D3. A non-transitory, computer-readable medium storing computer-executable instructions that, when executed by processing circuitry of a network node configured to provide a master cell group (MCG) for a user equipment (UE) that is also configured to communicate with the wireless network via a secondary cell group (SCG), configure the network node to perform operations corresponding to any of the methods of embodiments B1-B11.

D4. A computer program product comprising computer-executable instructions that, when executed by processing circuitry of a network node configured to provide a master cell group (MCG) for a user equipment (UE) that is also configured to communicate with the wireless network via a secondary cell group (SCG), configure the network node to perform operations corresponding to any of the methods of embodiments B1-B11.

The invention claimed is:

1. A method for a user equipment (UE) configured to communicate with a wireless network via a master cell group (MCG) and a secondary cell group (SCG), the method comprising:

detecting a failure in the SCG and selecting a failure cause, wherein the failure cause is selected from the following:

a first set of causes associated with an earlier version of communication functionality, and a second set of causes associated with a later version of communication functionality; and sending a failure information message to a network node that provides the MCG, wherein the failure information message indicates whether the failure cause is one of the first set or one of the second set.

2. The method of claim 1, wherein the failure information message indicates whether the failure cause is one of the first set or one of the second set based on including one or more of the following:

a first indication of one of the first set of causes;

a second indication of one of the second set of causes; and a third indication that the failure cause is indicated by the second indication.

3. The method of claim 2, wherein the first indication is a failureType-r15 field of the failure information message, the second indication is a failureType-r16 field of the failure information message, and the third indication is a failureTypeOther-r16 field of the failure information message.

4. The method of claim 2, wherein:

the first set of causes associated with the earlier version of communication functionality include at least two of the following: expiry of a timer T310, random access problem in the SCG, reaching a maximum number of retransmissions in UE's radio link control (RLC) for the SCG, reconfiguration with sync failure for the SCG, and reconfiguration failure of radio resource control (RRC) message; and the second set of causes associated with the later version of communication functionality include at least two of the following: expiry of a timer T312, consistent UE uplink listen-before-talk (LBT) failure in the SCG, a failed beam failure recovery (BFR) procedure in the SCG, and a backhaul radio link failure (RLF) in the SCG.

5. The method of claim 2, wherein:

the failure information message includes the first indication and the second indication; and the failure information message indicates whether the failure cause is one of the first set or one of the second set based on the following:

including the third indication, which indicates that the failure cause is indicated by the second indication of one of the second set of causes; and excluding the third indication, which indicates that the failure cause is indicated by the first indication of one of the first set of causes.

6. The method of claim 2, wherein:

the failure information message includes the first indication; and the failure information message indicates whether the failure cause is one of the first set or one of the second set based on the following:

including the second indication, which indicates that the failure cause is indicated by the second indication of one of the second set of causes; and excluding the second indication, which indicates that the failure cause is indicated by the first indication of one of the first set of causes.

7. The method of claim 2, wherein:

the failure information message includes the first indication;

the first set of causes also includes a further cause associated with the later version of communication functionality; and when the first indication indicates the further cause, the failure information message also includes the second indication.

8. The method of claim 7, wherein:

the failure information message indicates that the failure cause is one of the second set when the first indication indicates the further cause; and the failure information message indicates that the failure cause is one of the first set when the first indication indicates one of the causes associated with the earlier version of communication functionality.

9. The method of claim 2, wherein:

the failure information message includes either the first indication or the second indication; and the failure information message indicates whether the failure cause is one of the first set or one of the second set based on the following:

including the first indication, which indicates that the failure cause is indicated by the first indication of one of the first set of causes; and including the second indication, which indicates that the failure cause is indicated by the second indication of one of the second set of causes.

10. The method of claim 1, wherein:

the earlier version of communication functionality corresponds to Release 15 of 3GPP specifications; and the later version of communication functionality corresponds to Release 16 of 3GPP specifications.

11. The method of claim 1, wherein the network node that provides the MCG is an evolved Node B (eNB) and the failure information message is an SCGFailureInformation-NR message.

12. The method of claim 1, further comprising performing an SCG recovery procedure with the network node based on the selected failure cause.

13. A method for a network node configured to provide a master cell group (MCG) in a wireless network for a user equipment (UE) that is also configured to communicate with the wireless network via a secondary cell group (SCG), the method comprising:

receiving, from the UE, a failure information message indicating a failure detected by the UE in the SCG, wherein the failure information message indicates whether the failure cause is one of a first set of causes associated with an earlier version of communication functionality, or one of a second set of causes associated with a later version of communication functionality; and determining the failure cause based on the failure information message and at least one of the first set and the second set.

14. The method of claim 13, wherein the failure information message indicates whether the failure cause is one of the first set or one of the second set based on including one or more of the following:

a first indication of one of the first set of causes;

a second indication of one of the second set of causes; and a third indication that the failure cause is indicated by the second indication.

15. The method of claim 14, wherein the first indication is a failureType-r15 field of the failure information message, the second indication is a failureType-r16 field of the failure information message, and the third indication is a failure-TypeOther-r16 field of the failure information message.

16. The method of claim 14, wherein:

the first set of causes associated with the earlier version of communication functionality include at least two of the following: expiry of a timer T310, random access problem in the SCG, reaching a maximum number of retransmissions in UE's radio link control (RLC) for the SCG, reconfiguration with sync failure for the SCG, and reconfiguration failure of radio resource control (RRC) message; and the second set of causes associated with the later version of communication functionality include at least two of the following: expiry of a timer T312, consistent UE uplink listen-before-talk (LBT) failure in the SCG, a failed beam failure recovery (BFR) procedure in the SCG, and a backhaul radio link failure (RLF) in the SCG.

17. A user equipment (UE) configured to communicate with a wireless network via a master cell group (MCG) and a secondary cell group (SCG), the UE comprising:

communication interface circuitry configured to communicate with the wireless network via the SCG and the MCG; and processing circuitry operatively coupled to the communication interface circuitry, whereby the processing circuitry and the communication interface circuitry are configured to:

detect a failure in the SCG and select a failure cause, wherein the failure cause is selected from the following:

a first set of causes associated with an earlier version of communication functionality, and a second set of causes associated with a later version of communication functionality; and send a failure information message to a network node that provides the MCG, wherein the failure information message indicates whether the failure cause is one of the first set or one of the second set.

18. The UE of claim 17, wherein the failure information message indicates whether the failure cause is one of the first set or one of the second set based on including one or more of the following:

a first indication of one of the first set of causes;

a second indication of one of the second set of causes; and a third indication that the failure cause is indicated by the second indication.

19. A network node configured to provide a master cell group (MCG) in a wireless network for a user equipment (UE) that is also configured to communicate with the wireless network via a secondary cell group (SCG), the network node comprising:

communication interface circuitry configured to communicate with the UE via the MCG; and processing circuitry operatively coupled to the communication interface circuitry, whereby the processing circuitry and the communication interface circuitry are configured to:

receive, from the UE, a failure information message indicating a failure detected by the UE in the SCG, wherein the failure information message indicates whether the failure cause is one of a first set of causes associated with an earlier version of communication functionality, or one of a second set of causes associated with a later version of communication functionality; and determine the failure cause based on the failure information message and at least one of the first set and the second set.

20. The network node of claim 19, wherein the failure information message indicates whether the failure cause is one of the first set or one of the second set based on including one or more of the following:

a first indication of one of the first set of causes;

a second indication of one of the second set of causes; and a third indication that the failure cause is indicated by the second indication.

* * * * *